(12) United States Patent
Liang et al.

(10) Patent No.: US 10,165,403 B2
(45) Date of Patent: Dec. 25, 2018

(54) SYSTEMS AND METHODS FOR PERFORMANCE DRIVEN DYNAMIC GEO-FENCE BASED TARGETING

(71) Applicant: xAd, Inc., New York, NY (US)

(72) Inventors: Can Liang, Mountain View, CA (US); Huitao Luo, Fremont, CA (US); Pravesh Katyal, Mountain View, CA (US); Saravana Ravindran, Mountain View, CA (US); Hari Venkatesan, Cupertino, CA (US); Yi Jia, San Jose, CA (US); Shashi Seth, Mountain View, CA (US)

(73) Assignee: XAD, INC., New York, NY (US)

( * ) Notice: Subject to any disclaimer, the term of this patent is extended or adjusted under 35 U.S.C. 154(b) by 23 days.

(21) Appl. No.: 15/344,482

(22) Filed: Nov. 4, 2016

(65) Prior Publication Data

US 2017/0127233 A1 May 4, 2017

Related U.S. Application Data

(60) Provisional application No. 62/251,090, filed on Nov. 4, 2015.

(51) Int. Cl.
*H04W 4/021* (2018.01)
*H04L 12/26* (2006.01)
(Continued)

(52) U.S. Cl.
CPC .............. *H04W 4/022* (2013.01); *H04L 43/16* (2013.01); *H04L 67/22* (2013.01); *H04W 4/21* (2018.02); *H04W 72/06* (2013.01); *H04W 88/02* (2013.01)

(58) Field of Classification Search
CPC ....... H04W 4/21; H04W 72/06; H04W 88/02; H04W 4/021; H04W 4/022; H04W 4/023;
(Continued)

(56) References Cited

U.S. PATENT DOCUMENTS 9,706,355 B1 * 7/2017 Cali ...................... H04W 4/022
9,712,970 B2 * 7/2017 Barrand ................ H04W 4/022
(Continued)

OTHER PUBLICATIONS xAd, Inc., International Search Report and Written Opinion, PCT/US2016/060727, dated Mar. 31, 2017, 7 pgs.
(Continued)

*Primary Examiner* — Matthew C Sams
(74) *Attorney, Agent, or Firm* — Morgan, Lewis & Bockius LLP

(57) ABSTRACT

System and methods for running a location-based information campaign (campaign) select one or more first geo-blocks to form a first geo-fence from a plurality of geo-blocks each corresponding to a geographical region having at least one border defined by a real-world object and overlapping substantially with a targeted region associated with the location-based information campaign, and process information requests with respect to the first geo-fence. Each of the one or more first geo-blocks is associated with a respective performance score above a first threshold. The system and methods further monitor a pacing status associated with the campaign, and in response to a pacing goal associated with the campaign not being met, define a second geo-fence for the campaign, the second geo-fence including the one or more first geo-blocks and one or more second geo-blocks each associated with a respective performance score above a second threshold that is below the first threshold.

20 Claims, 20 Drawing Sheets

(51) Int. Cl.
*H04L 29/08* (2006.01)
*H04W 72/06* (2009.01)
*H04W 4/21* (2018.01)
*H04W 88/02* (2009.01)

(58) Field of Classification Search
CPC ............... H04L 43/16; G06Q 30/0261; G06Q 30/0259; G06Q 30/0267; G06Q 30/0201; H04M 1/72522
See application file for complete search history.

(56) References Cited

U.S. PATENT DOCUMENTS

| | | | | |
|---|---|---|---|---|
| 9,838,843 | B1* | 12/2017 | Bajaj | ............... H04W 4/022 |
| 2011/0244919 | A1 | 10/2011 | Aller et al. | |
| 2012/0179534 | A1 | 7/2012 | Moukas et al. | |
| 2012/0284769 | A1* | 11/2012 | Dixon | ............... H04W 4/021 726/1 |
| 2013/0006522 | A1* | 1/2013 | Vellaikal | ............ G06Q 30/0266 701/426 |
| 2013/0073388 | A1 | 3/2013 | Heath | |
| 2013/0099977 | A1* | 4/2013 | Sheshadri | ............. H04W 4/022 342/450 |
| 2013/0225282 | A1* | 8/2013 | Williams | ............... A63F 13/216 463/29 |
| 2013/0231137 | A1* | 9/2013 | Hugie | ............... H04W 24/00 455/456.3 |
| 2013/0324160 | A1* | 12/2013 | Sabatellil | ............... H04W 4/022 455/456.3 |
| 2014/0018096 | A1 | 1/2014 | Jagannath | |
| 2014/0164118 | A1* | 6/2014 | Polachi | ............... G06Q 30/0259 705/14.57 |
| 2014/0365307 | A1* | 12/2014 | Cheung | ............... G06Q 30/0261 705/14.58 |
| 2015/0213497 | A1* | 7/2015 | Jain | ............... G06Q 30/0261 705/14.58 |
| 2015/0278864 | A1* | 10/2015 | McDevitt | ........... G06Q 30/0261 705/14.58 |
| 2015/0287072 | A1* | 10/2015 | Golden | ............... G06Q 30/0244 705/14.43 |
| 2015/0341747 | A1* | 11/2015 | Barrand | ............. G06Q 30/0201 455/405 |
| 2016/0094944 | A1* | 3/2016 | Kong | ............... H04W 4/022 455/456.1 |
| 2017/0171704 | A1* | 6/2017 | Frenz | ............... H04W 4/021 |
| 2017/0289756 | A1* | 10/2017 | Barrand | ................. H04L 43/16 |

OTHER PUBLICATIONS xAd, Inc., International Preliminary Report on Patentability, PCT/US2016/060727, dated May 8, 2018, 6 pgs.

* cited by examiner

| Data Groups | Device Information | | User Information | | | Location Information | | Time of Request | |
|---|---|---|---|---|---|---|---|---|---|
| | IMEI | Make/Model | Age | Gender | Education | Device Location | Block ID | Day | Hour |
| 1 | 22***369 | Iphone 4 | 22 | F | C/U | (38.45, -102.27) | 0237456 | 8/1/2015 | 09:55 |
| 2 | 56***845 | Iphone 5 | 17 | F | HS | (45.32, -110.78) | 1125789 | 8/1/2015 | 09:53 |
| 3 | 36***963 | Nokia 2300 | 25 | M | C/U | (45.35, -110.75) | 1245879 | 81/2015 | 09:53 |
| 4 | 45***895 | Nokia 4566 | 36 | F | HS | (39.45, -104.98) | 6587498 | 8/1/2015 | 09:32 |
| 5 | 36***412 | Samsung 1179 | 23 | M | G/S | (45.33, -110.76) | 5236478 | 8/1/2015 | 09:21 |
| ... | ... | ... | ... | ... | ... | ... | | | |
| 9975 | 78***697 | Samsung 1179 | 22 | F | C/U | (45.35, -110.74) | 7854216 | 7/31/2015 | 10:01 |
| 9976 | 75***326 | Nokia 4500 | 40 | M | HS | (30.14, -98.25) | 5468785 | 7/31/2015 | 10:00 |
| ... | ... | ... | ... | ... | ... | ... | | | |

FIG. 8

| Bock ID | Spatial Index | Meta Data | | | |
| --- | --- | --- | --- | --- | --- |
| | | Functionality | Major POI | Demographic | inventory |
| ...... | ...... | ...... | ...... | ...... | ...... |
| 1234568 | a1, a2, ..., ai | Residential | Santa Clara High School | ...... | ...... |
| 1234569 | b1, b2, ..., bj | Retail | New India Bazar | ...... | ...... |
| 1234570 | c1, c2, ..., ck | Residential | Pomeroy Elementary | ...... | ...... |
| 1234571 | d1, d2, ..., dl | Retail | Moonlight Shopping Center | ...... | ...... |
| ...... | ...... | ...... | ...... | ...... | ...... |
| 1234573 | f1, f2, ..., fn | Recreational | Branham Park | ...... | ...... |
| ...... | ...... | ...... | ...... | ...... | ...... |

FIG. 11

SYSTEMS AND METHODS FOR PERFORMANCE DRIVEN DYNAMIC GEO-FENCE BASED TARGETING

CROSS REFERENCE TO RELATED APPLICATION

The present application claims priority to U.S. Patent Application No. 62/251,090, filed Nov. 4, 2015, entitled "Systems and Methods for Creating and Using Geo-Blocks," which is incorporated herein by reference in its entirety.

FIELD

The present disclosure is related to location-based information services, and more particularly to systems and methods for performance driven dynamic geo-fence based targeting.

DESCRIPTION OF RELATED ART

Mobile device locations are becoming more commonly available to mobile service providers. A main challenge in location-based information services is how to effectively translate location signals, which are typically expressed in (latitude, longitude) pairs, into meaningful signals such as intention, demographics, and lifestyles that are useful for serving relevant information to mobile device users.

Existing location-based targeting systems make use of various static geo-fences that mark a set of geographical regions. Some examples of this type of geo-fences include zipcode boundaries and circles centered at certain business entities. In the context of mobile advertising, before the start of an ad campaign, a geo-fence for the campaign is defined based on industry standard practices, considerations of various performance metrics as well as the total volume of reachable mobile device users. During the campaign, each user's real time location is checked with respect to the predefined geo-fence and users that are inside the geo-fence become potential candidates for receiving advertisements (or ads). In reality, many complications, such as the randomness in user behavior, uncertainty in location signal generation, coexisting competing service providers, collectively render a reachable volume of mobile device users highly unpredictable. As a result, the design of geo-fences often needs to ensure a large safety margin of reachable user volume, at the cost of significantly limiting the space for performance optimization.

Zip code has been used for location-based targeting, where a location signal (e.g., latitude/longitude pair) is first mapped to a zip code, and advertisement targeting, inventory analysis, and behavior analysis are carried out at the zip code level. One advantage of this approach is that zip code level demographic profiles are easily available through government sources. In many cases, however, areas sharing the same zip code tend to serve wildly different functionalities and include a diverse range of communities. Consequently, zip codes often fail to provide satisfactory mapping from location to signals mentioned above for serving relevant information to mobile device users.

As an improvement to zip code level partitioning, PlaceIQ proposed to cover the world with 1 billion 100 meter by 100 meter virtual tiles. (See http://www.placeiq.com/2013/11/27/placeiq-patent-validates-innovative-approach-to-mobile-targeting/). This approach divides or groups real world objects in arbitrary fashion and falls short in capturing similarities or highlight differences between nearby tiles when they share the same or have distinctly different properties. Furthermore, high volume of road traffic running through the tiles can pose a significant challenge for accurately determining tile related location intent. Lastly, since the majority of the globe is not populated, most of the proposed 1 billion tiles cover nothing that is interesting to location-based information services.

BRIEF DESCRIPTION OF THE DRAWINGS

FIG. 8 is a table illustrating a request log according to certain embodiments.

FIG. 11 is a table illustrating exemplary data structures of meta data enriched geo-blocks according to certain embodiments.

DESCRIPTION OF THE EMBODIMENTS

The present disclosure provides methods and systems for partitioning urban areas using geographical information of transportation routes, natural boundaries and other real world objects to produce geo-blocks that are highly relevant to specific types of human activities, methods and systems for using mobile device signals to fine-tune and enrich the geo-blocks, methods and systems for designing dynamic geo-fences using the geo-blocks in order to serve relevant information to mobile device users.

Figure 1:
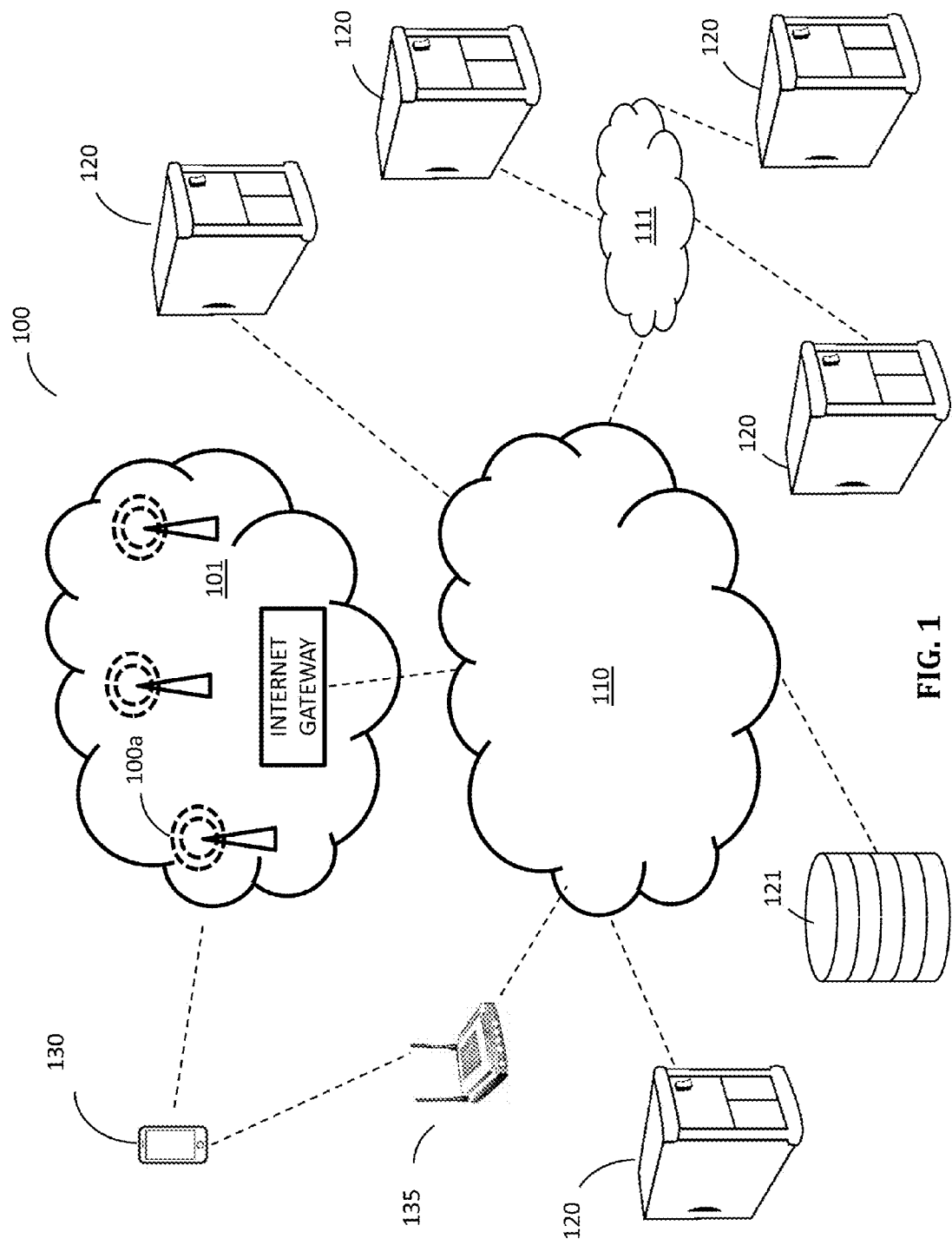
FIG. 1 is a diagrammatic representation of a packet-based network according to embodiments.

FIG. 1 illustrates a packet-based network 100 (referred sometimes herein as "the cloud"), which, in some embodiments, includes part or all of a cellular network 101, the Internet 110, and computers/servers 120, coupled to the Internet (or web) 110. The computers/servers 120 can be coupled to the Internet 110 using wired Ethernet and optionally Power over Ethernet (PoE), WiFi, and/or cellular connections via the cellular network 101 including a plurality of cellular towers 101a. The network may also include one or more network attached storage (NAS) systems 121, which are computer data storage servers connected to a computer network to provide data access to a heterogeneous group of clients. As shown in FIG. 1, one or more mobile devices 130 such as smart phones or tablet computers are also coupled to the packet-based network via cellular connections to the cellular network 101, which is coupled to the Internet 110 via an Internet Gateway. When a WiFi hotspot (such as hotspot 135) is available, a mobile device 130 may connect to the Internet 110 via a WiFi hotspot 135 using its built-in WiFi connection. Thus, the mobile devices 130 may interact with other computers/servers coupled to the Internet 110.

The computers/servers 120 coupled to the Internet may include one or more mobile service providers, such as mobile publishers that interact with mobile devices running apps provided by the publishers, information providers (e.g., mobile advertisers) that select relevant information for sending to the mobile devices via, for example, the mobile publishers, and one or more computer/servers for collecting and/or processing data associated with the mobile devices. The publishers, as they interact with the mobile devices, generate mobile supplies, which can be, for example, requests for relevant information carrying characteristics of the mobile devices, certain information about their users, and raw location data associated with the mobile devices, etc. The publishers may provide the mobile supplies directly or indirectly to the information providers, or fulfill the supplies themselves.

One example of information service is to deliver advertisements to mobile devices as they interact with the publishers and application developers. Advertisers (information providers), agencies, publishers and ad middlemen can also purchase mobile supplies through ad exchanges. Ad networks and other entities also buy ads from exchanges. Ad networks typically aggregate inventory from a range of publishers, and sell it to advertisers for a profit. An ad exchange is a digital marketplace that enables advertisers and publishers to buy and sell advertising space (impressions) and mobile ad inventory. The price of the impressions can be determined by real-time auction, through a process known as real-time bidding. That means there's no need for human salespeople to negotiate prices with buyers, because impressions are simply auctioned off to the highest bidder. These processes take place in milliseconds, as a mobile device loads an app or webpage.

Advertisers and agencies can use demand-side platforms (DSP), which are softwares that use certain algorithms to decide whether to purchase a certain supply. Many ad networks now also offer some sort of DSP-like product or real-time bidding capability. As on-line and mobile publishers are making more of their inventory available through exchanges, it becomes more cost efficient for many advertisers to purchase ads using DSPs.

An ad server is a computer server, e.g., a web server, backed by a database server, that stores advertisements used in online marketing and place them on web sites and/or mobile applications. The content of the webserver is constantly updated so that the website or webpage on which the ads are displayed contains new advertisements—e.g., banners (static images/animations) or text—when the site or page is visited or refreshed by a user. In addition to selecting and delivering ads to users, the ad servers also manage website advertising space and/or to provide an independent counting and tracking system for advertisers. Thus, the ad servers provide/serve ads, count them, choose ads that will make the websites or advertisers most money, and monitor progress of different advertising campaigns. Ad servers can be publisher ad servers, advertiser ad servers, and/or ad middleman ad servers. An ad server can be part of the same computer or server that also act as a publisher, advertiser, and ad middleman.

Ad serving may also involve various other tasks like counting the number of impressions/clicks for an ad campaign and generating reports, which helps in determining the return on investment (ROI) for an advertiser on a particular website. Ad servers can be run locally or remotely. Local ad servers are typically run by a single publisher and serve ads to that publisher's domains, allowing fine-grained creative, formatting, and content control by that publisher. Remote ad servers can serve ads across domains owned by multiple publishers. They deliver the ads from one central source so that advertisers and publishers can track the distribution of their online advertisements, and have one location for controlling the rotation and distribution of their advertisements across the web.

The computers/servers 120 can include server computers, client computers, personal computers (PC), tablet PC, set-top boxes (STB), personal digital assistant devices (PDA), web appliances, network routers, switches or bridges, or any computing devices capable of executing instructions that specify actions to be taken by the computing devices. As shown in FIG. 1, some of the computers/servers 120 are coupled to each other via a local area network (LAN) 110, which in turn is coupled to the Internet 110. Also, each computer/server 120 referred herein can include any collection of computing devices that individually or jointly execute instructions to provide one or more of the systems discussed herein, or to perform any one or more of the methodologies or functions discussed herein, or to act individually or jointly as one or more of a publisher, an information provider, an advertiser, an advertisement agency, an ad middleman, an ad server, an ad exchange, etc, which employs the systems, methodologies, and functions discussed herein, by executing certain instructions.

Figure 2:
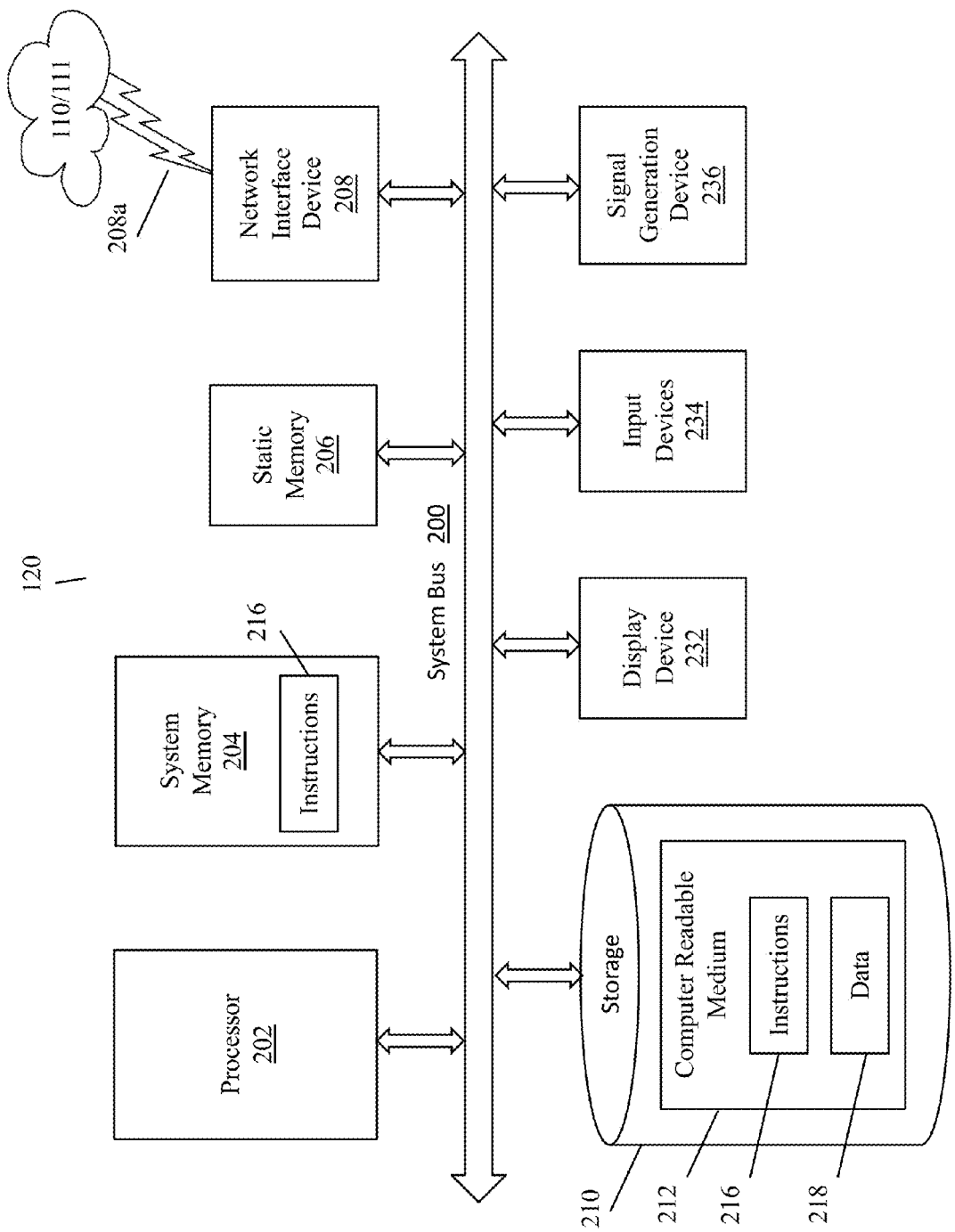
FIG. 2 is a diagrammatic representation of a computer/server that performs one or more of the methodologies and/or to provide part or all of a system for lift measurement according to embodiments.

FIG. 2 illustrates a diagrammatic representation of a computer/server 120 according to certain embodiments. The computer/server 120 may operate as a standalone device or as a peer computing device in a peer-to-peer (or distributed) network computing environment. As shown in FIG. 2, the computer/server 120 includes one or more processors 202 (e.g., a central processing unit (CPU), a graphic processing unit (GPU), and/or a digital signal processor (DSP)) and a system or main memory 204 coupled to each other via a system bus 200. The computer/server 120 may further include static memory 206, a network interface device 208, a storage unit 210, one or more display devices 230, one or more input devices 234, and a signal generation device (e.g., a speaker) 236, with which the processor(s) 202 can communicate via the system bus 200.

In certain embodiments, the display device(s) 230 include one or more graphics display units (e.g., a plasma display panel (PDP), a liquid crystal display (LCD), a projector, or a cathode ray tube (CRT)). The input device(s) 234 may include an alphanumeric input device (e.g., a keyboard), a cursor control device (e.g., a mouse, trackball, joystick, motion sensor, or other pointing instrument). The storage unit 210 includes a machine-readable medium 212 on which is stored instructions 216 (e.g., software) that enable anyone or more of the systems, methodologies or functions described herein. The storage unit 210 may also store data 218 used and/or generated by the systems, methodologies or functions. The instructions 216 (e.g., software) may be loaded, completely or partially, within the main memory 204 or within the processor 202 (e.g., within a processor's cache memory) during execution thereof by the computer/server 120. Thus, the main memory 204 and the processor 1102 also constitute machine-readable media.

While machine-readable medium 212 is shown in an exemplary embodiment to be a single medium, the term "machine-readable medium" should be taken to include a single medium or multiple media (e.g., a centralized or distributed database, or associated caches and servers) able to store instructions (e.g., instructions 1124). The term "machine-readable medium" shall also be taken to include any medium that is capable of storing instructions (e.g., instructions 216) for execution by the computer/server 120 and that cause the computing device 1100 to perform anyone or more of the methodologies disclosed herein. The term "machine-readable medium" includes, but not be limited to, data repositories in the form of solid-state memories, optical media, and magnetic media. In certain embodiments, the instructions 216 and/or data 218 can be stored in the network 100 and accessed by the computer/server 120 via its network interface device 208, which provides wired and/or wireless connections to a network, such as a local area network 111 and/or a wide area network (e.g., the Internet 110) via some type of network connectors 280a. The instructions 216 (e.g., software) and or data 218 may be transmitted or received via the network interface device 208.

Figure 3A:
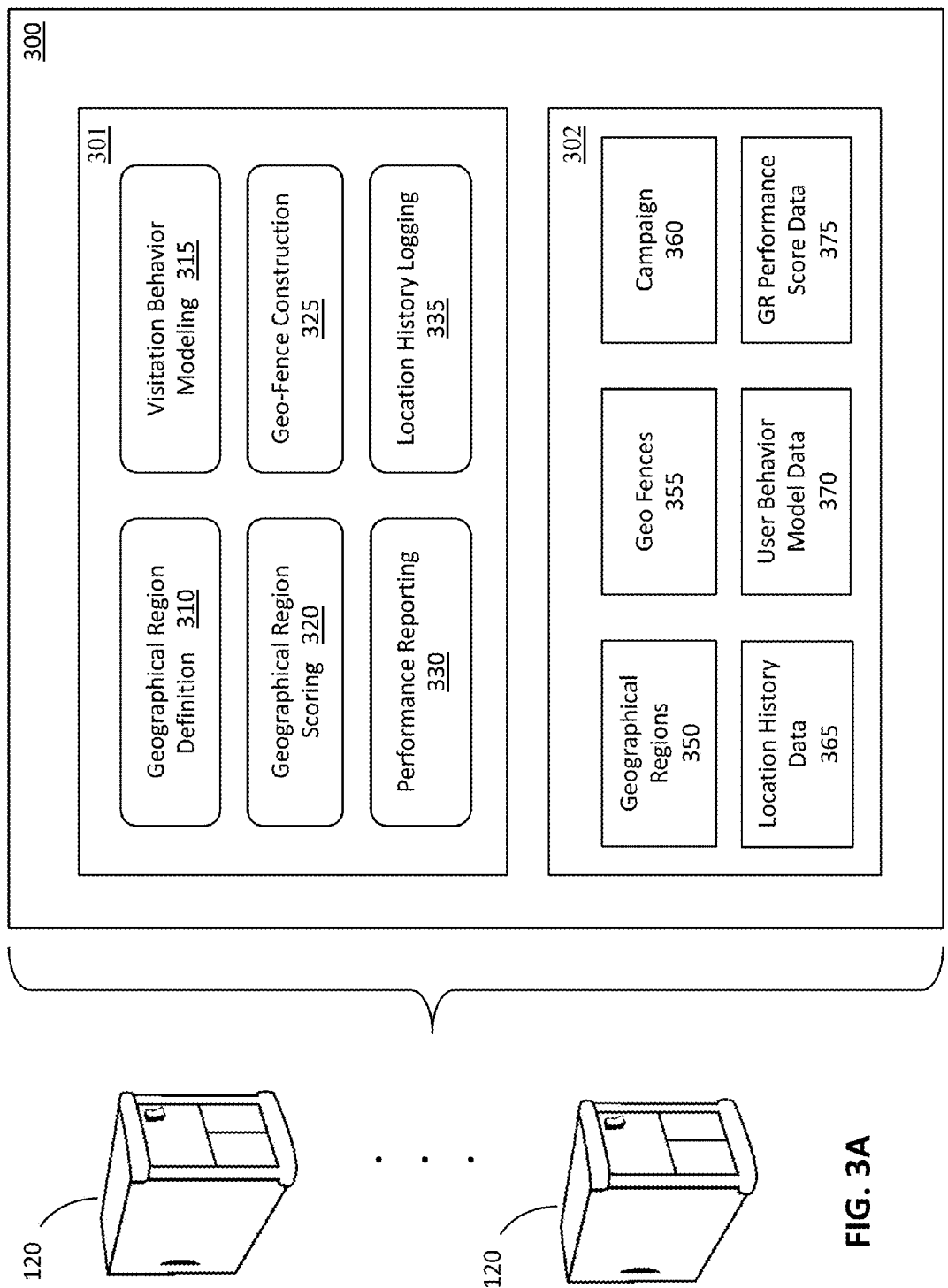
FIG. 3A is diagrammatic representation of a geo-fencing system provided by one or more computer/server systems according to certain embodiments.

FIG. 3A is a diagrammatic representation of a geo-fencing system 300 provided by one or more computer/server systems 120 according to certain embodiments. System 300 can be used to construct dynamically adjusted geo-fences that utilize location visitation patterns to optimize performance metric driven by campaign goals while ensuring that a total volume of users can be reached for mobile advertising. As shown in FIG. 2 and FIG. 3A, the processor(s) 202 in the computer/server system(s) 120, when executing one or more software programs loaded in the respective main memory (or memories) 204, provide the geo-fencing system 300 including a geographical region definition subsystem 310, a visitation behavior modeling subsystem 315, a geographical region performance scoring subsystem 320, a geographical region selection subsystem 325, a real-time performance metric reporting subsystem 330, and a location history data-logging subsystem 335. The system 300 makes use of a plurality databases storing data used and/or generated by the geo-fencing system 300, including a database 350 for storing the geometry and meta information of generated geographical regions, a database 355 for storing constructed geo-fence spatial indices, a database 360 for storing campaign information, a database 365 for storing logged mobile supply data, and one or more other databases (e.g., database 370 for storing computed meta data such as mobile device user behavior model data and database 375 for storing geographical regions' performance score data, etc.). Any or all of these databases can be located in the storage(s) 210 of the one or more computer systems 120, or in one or more other server/computer system(s) 120 and/or NAS 121 in the network 100, which the process(s) 202 can access via the network interface device 208.

Figure 3B:
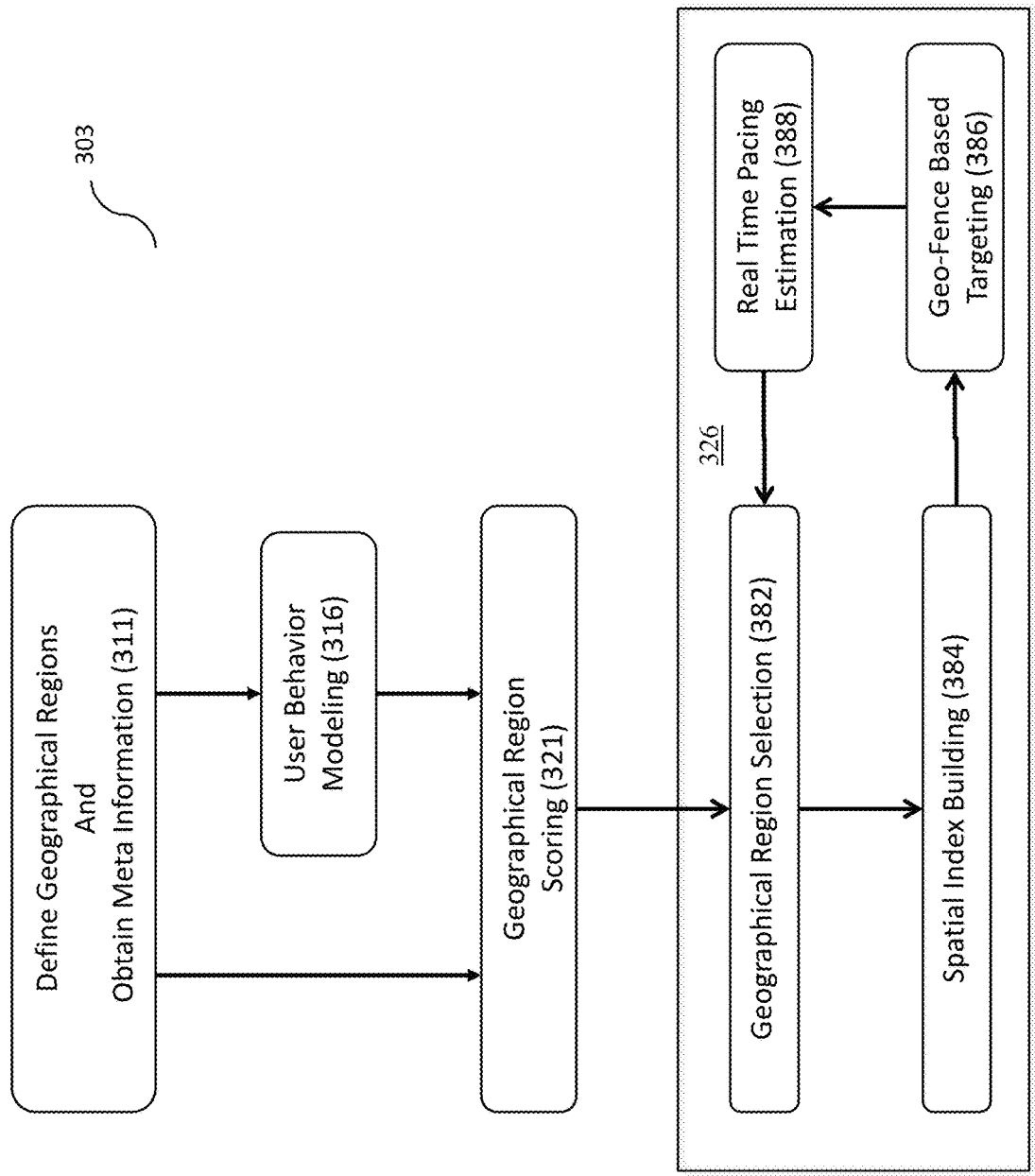
FIG. 3B is a flowchart illustrating a geo-fencing method performed by the geo-fencing system according to certain embodiments.

FIG. 3B is a flowchart illustrating a geo-fencing method 303 performed by the geo-fencing system 300 according to certain embodiments. As shown in FIG. 3B, the geo-fencing method 303 includes a process 311 performed by the geographical region definition subsystem 310, in which geographical regions are defined and associated meta information is obtained, as discussed in further detail below. In certain embodiments, various meta information can be mapped to a defined geographical region, such as its functionality (residential, work, retail etc), its average mobile user volume and its KPI performance index. The meta information can be made available to the other subsystems in the system 300 and can be incorporated into the construction of the geo-fences.

The method 303 further includes visitation behavior modeling process 316, which models the visitation behavior of intended mobile device users, for example, customers of a particular brand or a particular business entity. In certain embodiment, the visitation behavior modeling subsystem estimates the probability for customers of a particular business entity to visit different geographical regions by first obtaining a sample set of customers of the business entity, then extracting from data provided by subsystem 335 the visitation history of these sample customers to the geographical regions stored in database 370.

The method 303 further includes a performance scoring process 321, in which a quality score is assigned for each of the geographical regions. In certain embodiment, the score is dependent on specific campaign performance goal(s). For example, in some cases, an ad campaign's goal is to drive more people to visit their branded stores. Then, the performance score of a geographical region can be defined as the likelihood of a user to visit a branded store after the user has visited this particular geographical region. In cases that brand sales revenue is of interest, the performance score can be derived from brand customer visitation behavior and purchase behavior.

In certain embodiments, processes 311, 316, and 321 are performed offline. The method 303 further includes a geo-fence construction process 326 performed by the geo-fence construction subsystem 325. In certain embodiments, the geo-fence construction process 326 include several on-line processes, part or all of which can be performed on-line or in real time. As shown in FIG. 3B, the geo-fence construction process 326 includes a geographical region selection process 382, a spatial index building process 384, a geo-fence-based targeting process 386 and a real-time pacing estimation process 388. At the start of a campaign, the geographical region scoring subsystem 320 provides initial geo-fences by selecting certain number of top scoring geographical regions. This number can be determined based on consideration of estimated average performance or average total reachable user volume. These regions are processed to produce a spatial index file, which is then used to detect users whose real time locations fall within an active geo-fence. These users become potential candidates for receiving information service. Concurrently, subsystem 325 tracks the rate at which information related to the campaign is being served to users (i.e., pacing status) and adjusts the geo-fence accordingly in process 326. Thus, balance between performance and pacing can be reached using the method 303.

Figure 4A:
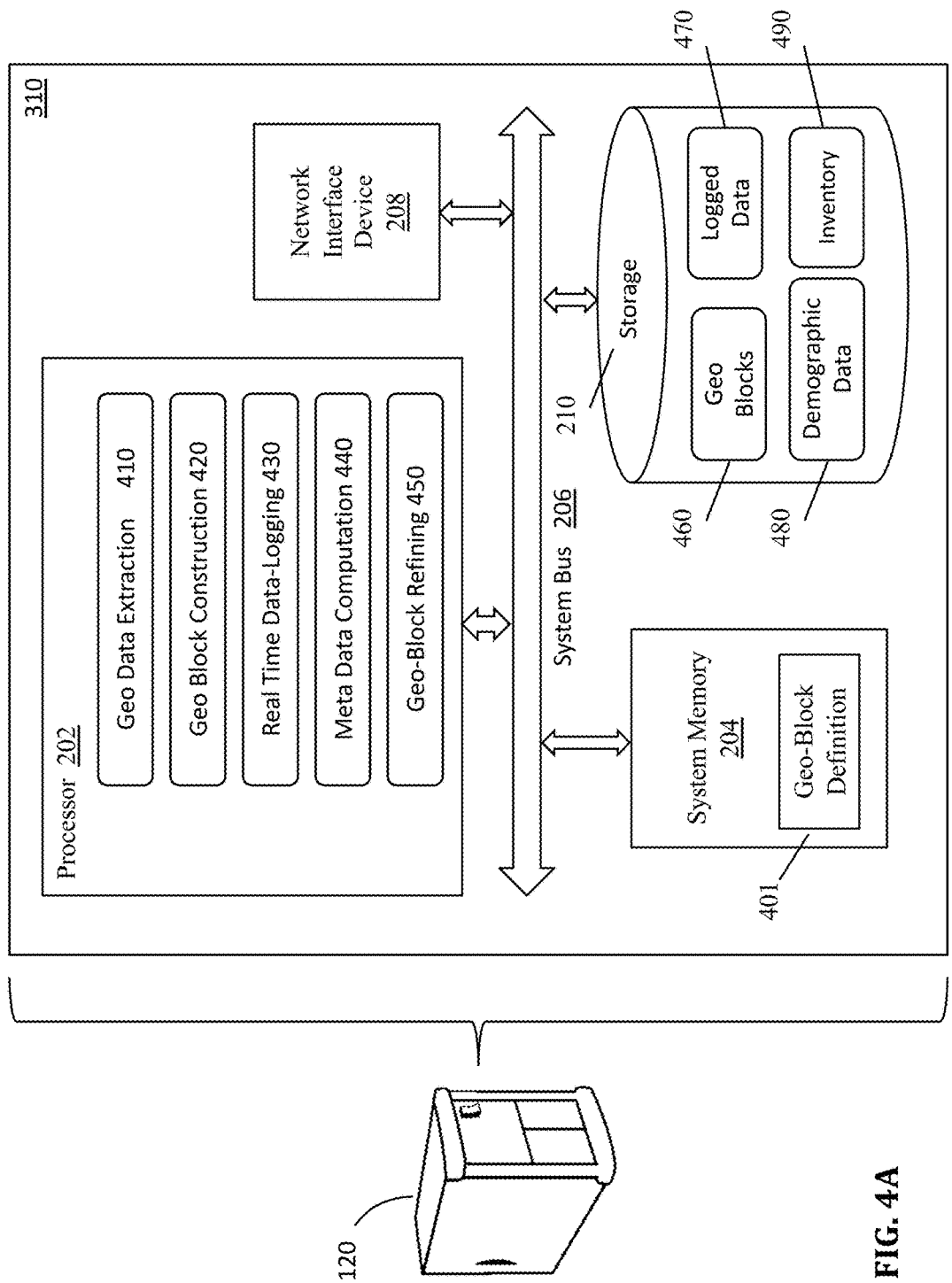
FIG. 4A is a diagrammatic representation of a geo-block definition subsystem provided by a computer/server system according to certain embodiments.

FIG. 4A is a diagrammatic representation of the geo-block definition subsystem 310 provided by a computer/server system 120 according to certain embodiments. As shown in FIG. 4A, the processor 202 in the computer/server system(s) 120, when executing a geo-block definition software program 401 loaded in the main memory 204, provides the geo-block definition subsystem 310, which includes a geo data extraction module 410, a geo-block construction module 420, a real-time data-logging module 430, a meta data computation module 440, and a geo-block refining module 450. The system 400 makes use of a plurality databases storing data used and/or generated by the geo-block definition subsystem 310, including a database 460 for storing the geo-blocks generated by the geo-block construction module 420 and/or the geo-block refining module 450, a database 470 for storing logged mobile supply data, and one or more databases (e.g., database 480 and 490) for storing computed meta data such as demographic data and inventory data. Any or all of these databases can be located in the storage 210, or in another server/computer 120 and/or NAS 121 in the network 100, which the process 202 can access via the network interface device 208.

Figure 4B:
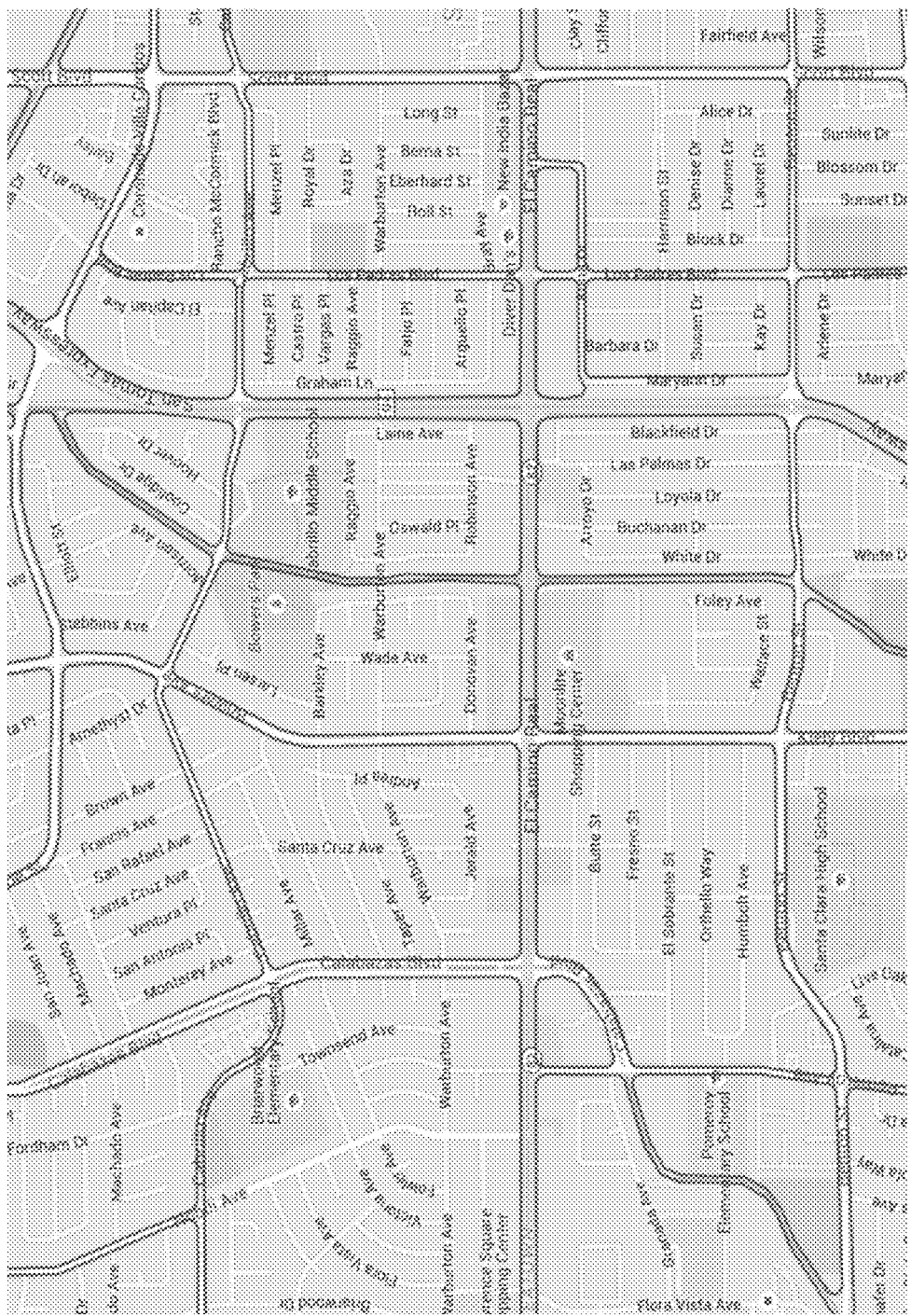
FIG. 4B is map image illustrating exemplary geo-blocks overlaid on a map of a geographical region created by the geo-block definition subsystem according to certain embodiments.

FIG. 4B illustrates exemplary geo-blocks created by the subsystem 310 according to certain embodiments. In this example, for an area in the city of Santa Clara, Calif., the geo-blocks are shown as outlined in red boundaries overlaid on top of a map for the area, taken from, for example, Google Map, and the boundaries of the geo-blocks are mostly aligned with major roads, taking into account the road width so as to exclude mobile signals from travelers on the major roads. Each of the geo-blocks shown can be further partitioned into more granular blocks bordered by smaller roads. Real world entities present in these geo-blocks tend to serve common functional purposes (residential, retail etc.) and these blocks form the foundation for the construction of boundaries that are highly indicative of location dependent attributes such as intention and demographics.

In general, the definition of geographical regions is not limited to that described above. A different set of geographical regions with or without its own meta information can also be used for the subsequent processes.

Figure 5:
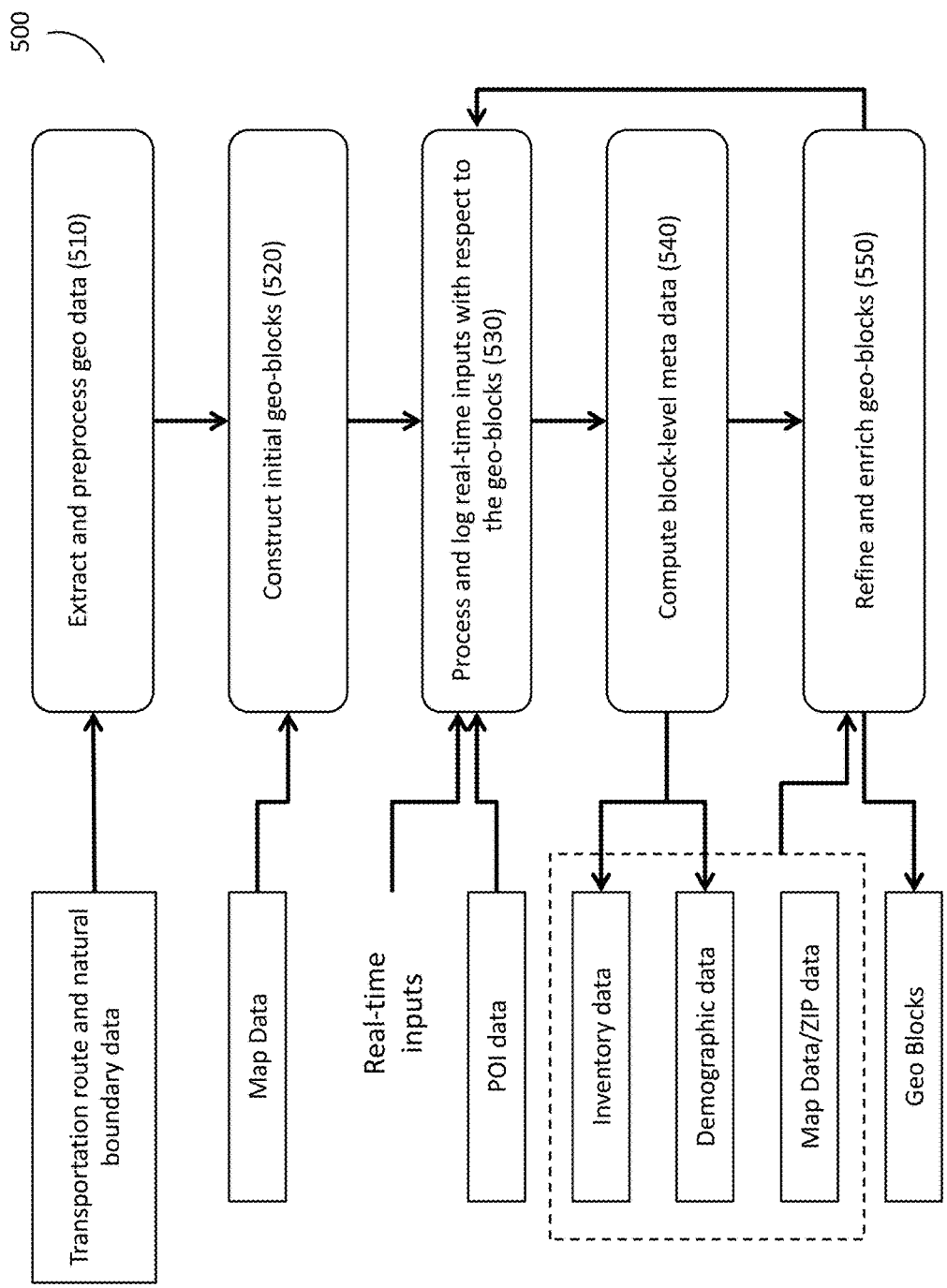
FIG. 5 is a flowchart illustrating a method performed by the geo-block definition system according to certain embodiments.

FIG. 5 illustrates a method 500 performed by the geo-block definition system 300 according to certain embodiments. As shown in FIG. 5, the geo data extraction module 410 obtains publicly available transportation route and natural boundary data from a server in the network 100 that provides the data, and extracts and pre-processes (510) geographical information of transportation routes and natural boundaries (geo-data) based on the transportation route and natural boundary data. The geo block construction module 420 creates (520) geo-blocks using the extracted geo data and publicly available map data. The real-time data-logging module 430 processes and logs (530) real-time mobile supplies (e.g., requests for advertisement from mobile publishers) with respect to the created geo-blocks. The meta data computation module 440 obtains (540) meta data such as location specific attributes from the logged mobile supply data and various data sources. The geo-block refining module 450 refines (550) the geo-blocks to improve boundary cases and to incorporate geographical information of real world objects not considered by the geo-block construction module 420, and to enrich the geo-blocks with relevant meta data.

In process 510, geographical information of transportation routes (highways, railways, waterways etc.), as well as natural boundaries (coastlines, lake boundaries etc.) are collected. One example data source for this purpose is OpenStreetMap (www.openstreetmap.org/). Geometrically, these objects are described as collections of line segments, together with meta data information such as their type, width and traffic speed. In certain embodiments, these line segments are collected and scored based on their significance, e.g., residential area roads in residential area score lower than highways do. Line segments scored above a threshold are collected to form a line set, which is used in process 520 to define initial geo-blocks.

Figure 6:
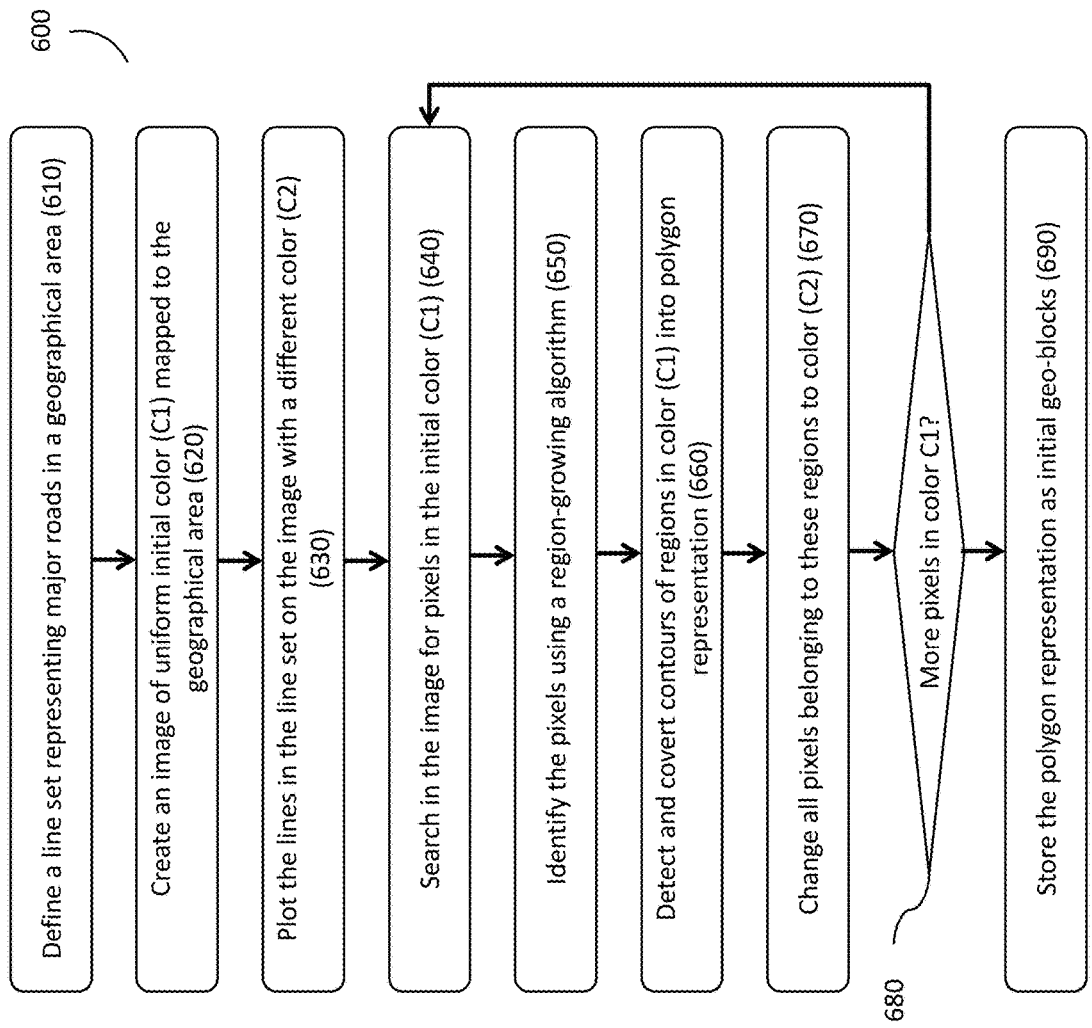
FIG. 6 is a flowchart illustrating a method for forming polygons outlining initial geo-blocks according to certain embodiments.

In process 520, the line set defined in process 510 is used to form polygons with boundaries aligned with the lines in the line set. FIG. 6 illustrates a method 600 for forming such polygons according to certain embodiments. As shown in FIG. 6, the method 600 comprises:

(610) defining a line set (620) creating an image of uniform initial color (C1), the size of the image being mapped to geographical area based on some predefined scaling ratio;

(630) plotting the lines in the line set on the image with a different color (C2), taking into account road widths by plotting the lines with different thicknesses based on their width and scale information;

(640) searching in the image for pixels in the initial color (C1) as uncovered regions;

(650) for each uncovered region, identifying the pixels belong to this region using a region-growing algorithm;

(660) detecting and converting the contours of this region into a polygon representation;

(670) changing all of the pixels belonging to this region to the color (C2) to indicate that the region is covered;

(680) determining whether there are still more pixels in color (C1) and repeating processes (640) through (670) until no more pixel in color C1 is found; and (690) storing the polygon representation as initial geo-blocks.

The polygons thus formed are initial geo-blocks. In certain embodiments, to define geo-blocks on a national or global scale while maintaining sub-meter accuracy, the image processing method 600 is used on each of multiple small areas and the polygons from the multiple small areas are merged to form initial geo-blocks for a larger area. By using different thresholds, geo-blocks of different granularities can be constructed to form hierarchical layers of geo-blocks. The geo-blocks formed in process 520 are indexed and stored in the geo-block database 460.

Figure 7:
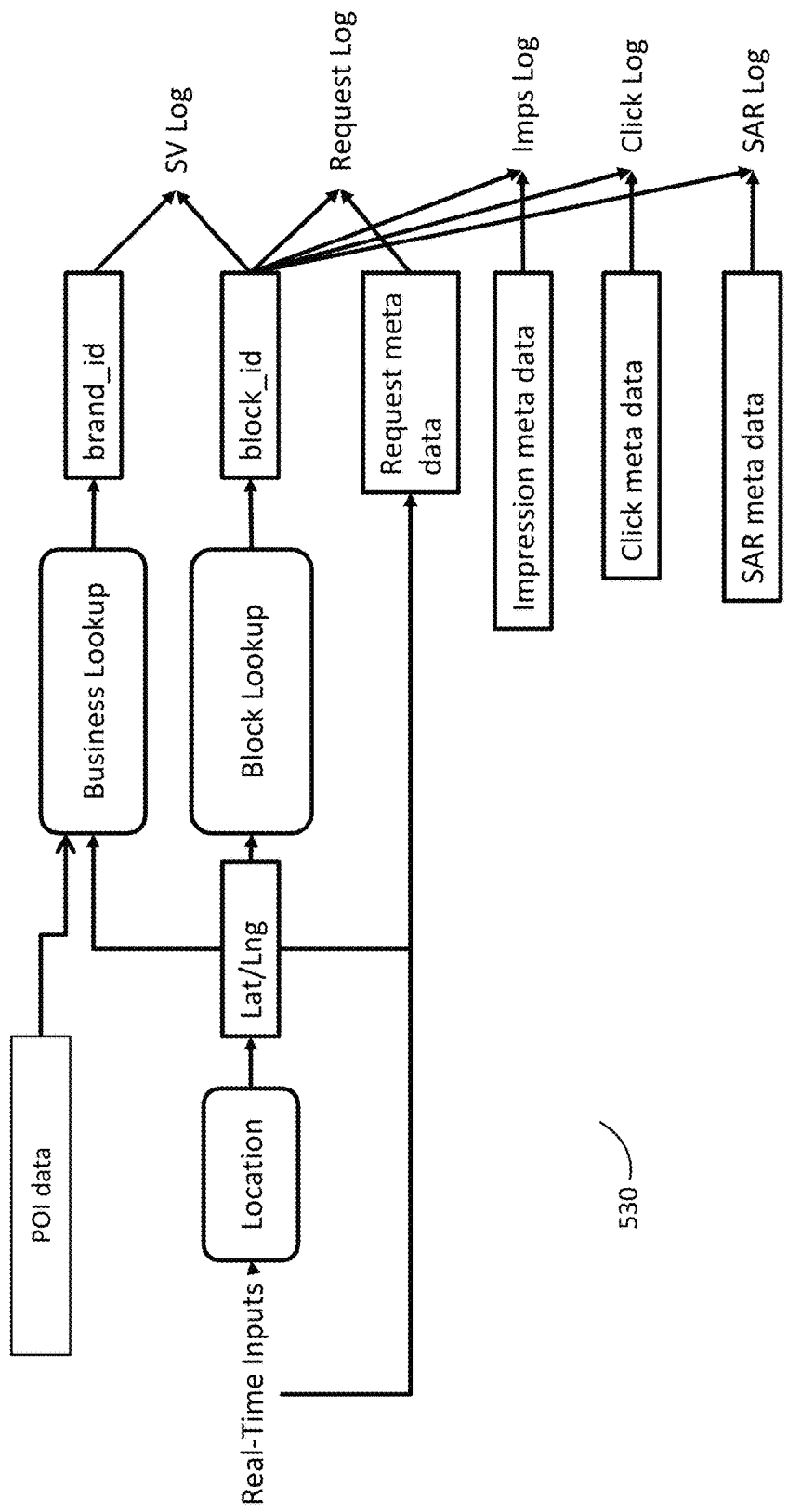
FIG. 7 is a flowchart illustrating a method for processing and logging real-time inputs (e.g., ad requests) with respect to initial geo-blocks according to certain embodiments.

In certain embodiments, real-time inputs (e.g., ad requests) are processed and logged with respect to the initial geo-blocks in process 530, as illustrated in FIG. 7. For example, given an incoming ad request or any other signal carrying location information of a mobile device, the location information is processed by a location module, such as the one disclosed in co-pending U.S. patent application Ser. No. 14/716,811, filed May 19, 2015, entitled "System and Method for Marketing Mobile Advertising Supplies," which is incorporated herein by reference in its entirety. The location module outputs verified or derived mobile device location in the form of, for example, latitude/longitude (lat/long), which is then processed by a block Lookup module. The block lookup module carries out a spatial search against the block index in the geo-block database 460 to determine which geo-block the mobile device is located in, and returns a block_id identifying the geo-block in which the mobile device is located.

Similarly, the mobile device location is processed by a point of interest (POI) lookup module to determine if the location is associated with any POI (indicating that the user might be visiting the POI). In some implementation, this lookup is implemented as a spatial index search over a POI list, a device is associated with a POI whenever its location triggers an existing POI geo-fence (e.g., a circular fence surrounding a business location of a brand). In some other implementation, a POI is represented as a polygon geo-fence corresponding to the building, area, or the parking lot of the POI. A POI association is identified whenever the device location triggers the POI geo-fence, as described in co-pending U.S. patent application Ser. No. 14/716,811 cited above.

As illustrated in FIG. 7, process 530 creates five log files for each real-time input triggering a POI: the POI visitation log (SV log), a request log, an impression log (imps log), a click log and a secondary action log (SAR log). The essential components of each log are described as follows:

SV Log: (UID, BRAND_ID, TIMESTAMP, BLOCK_ID)

Request Log: (UID, REQUEST_ID, BLOCK_ID, other typical request meta data)

Imps Log: (UID, REQUEST_ID, BLOCK_ID, other typical imps meta data)

Click Log: (UID, REQUEST_ID, BLOCK_ID, other typical click meta data)

SAR Log: (UID, REQUEST_ID, BLOCK_ID, other typical sar meta data)

Here UID is the unique device id in the forms of UUID, IDFA, GIDFA or ANDROID_ID; REQUEST_ID is the unique id identifying a particular real-time input (e.g., ad request), BLOCK_ID represents a unique geo-block in which the mobile device associated with the real-time input is located. As an example, FIG. 8 is a table illustrating a request log according to certain embodiments.

In certain embodiments, one or more of the above logs can be used in process 540 to compute meta data for the geo-blocks, which can be used to determine neighborhood attributes associated with the geo blocks. For example, human activity levels can be studied by counting ad request frequency, and geo-block associations can be determined by finding subsets of geo-blocks that share the presence of the same mobile devices. Furthermore, residential geo-blocks with home zip code data (Infousa is one of such data provider) and map demographical data can be identified. Retail, school or office geo-blocks can be recognized with POI data (Infousa, Tomtom, OpenStreetMap are examples of data providers).

In process 550, the geo-blocks are refined and enriched by applying merge and/or split of existing geo-blocks and by adding meta data to the geo-blocks. In one embodiment, meta data such as zip data, POI data, and demographic data, and logged real-time input data are overlaid to the existing geo-blocks and each block is evaluated by a merge step and a split step. In the merge step, the block geometry and meta data are used to determine the level of similarity between blocks. For example, two adjacent blocks may be merged if they both are residential areas and showing similar mobile device user behaviors. Another example is that a group of nearby geo-blocks that each have insufficient ad request data may be merged together for statistically more reliable analysis.

In the split step, the meta data is used to determine the neighborhood attributes represented by certain geo-blocks to determine whether and how each of these geo-blocks should be split into multiple smaller geo-blocks each with a more distinct neighborhood attribute. In certain embodiments, further refinement can be made with information of real world objects other than the boundary information used to create the initial geo-blocks. If any inconsistency is identified within a block, a split is carried out to divide a block into a number of smaller blocks each capturing more consistent neighborhoods.

Figure 9:
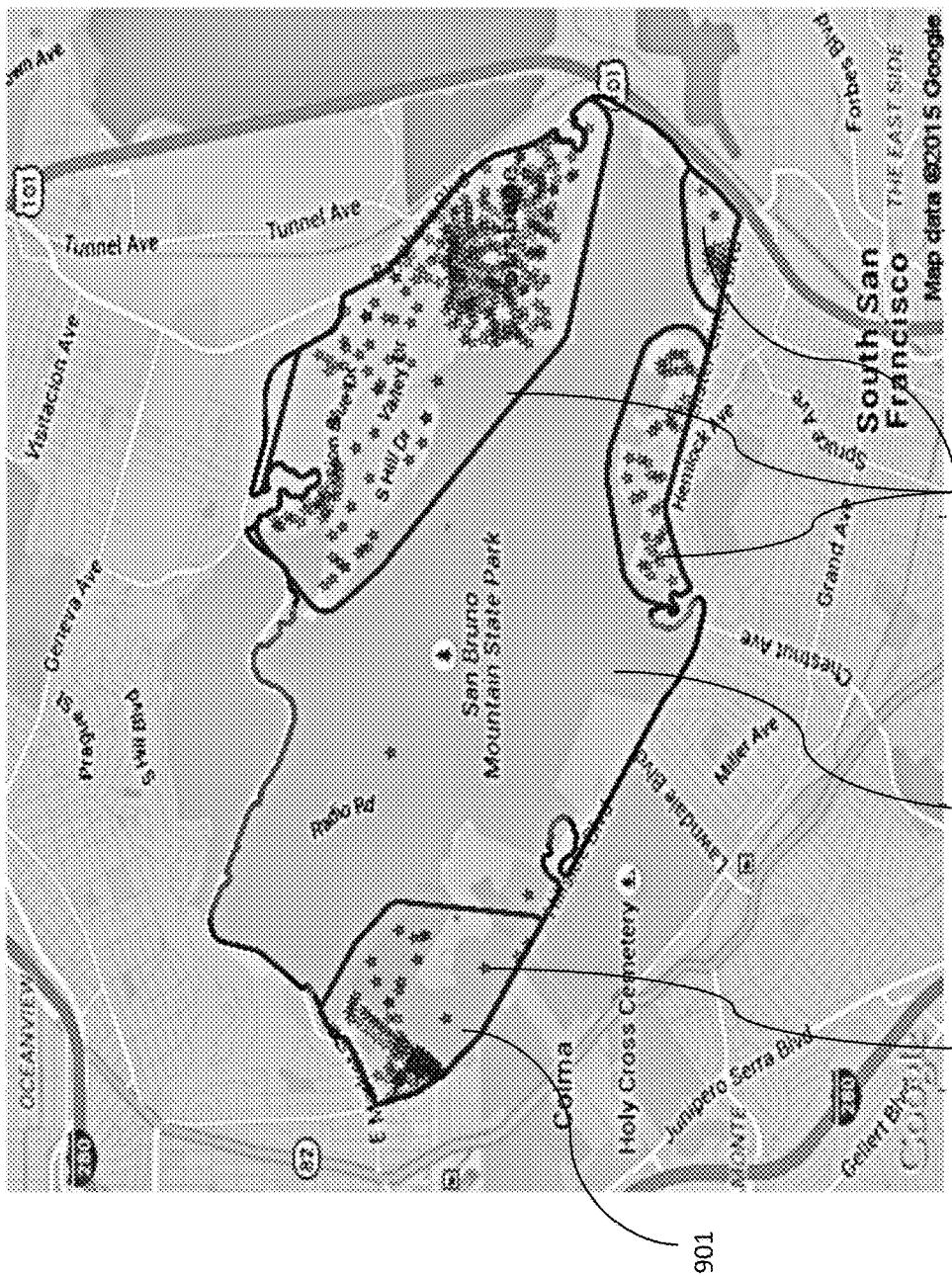
FIG. 9 is a map overlay diagram of geo-blocks illustrating separation of residential areas (enclosed by blue polygons) and a forest area by investigating spatial distribution of 9-digit zip codes.
Figure 10:
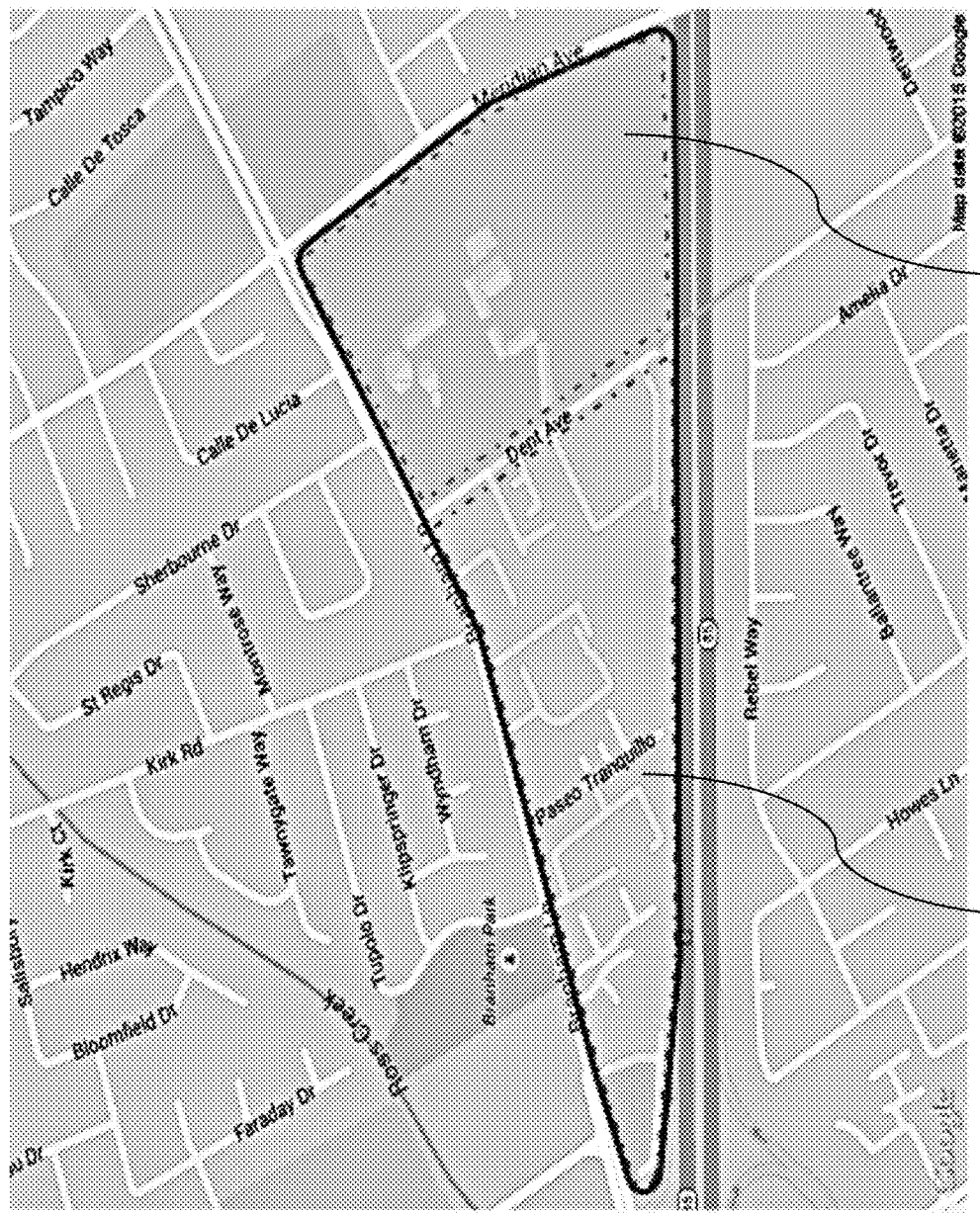
FIG. 10 is a map overlay diagram of geo-blocks illustrating separation of an elementary school from residential area.

FIG. 9 illustrates the separation of residential areas 901 (enclosed by blue polygons) and a forest area 902 by investigating the spatial distribution of 9-digit zip codes (Infousa) or by analyzing logged real-time inputs (e.g., ad requests) with detected locations 903 represented by the red stars. FIG. 10 demonstrates the separation of an elementary school 1001 from a residential area 1002, where the school boundary data is derived from OpenStreetMap.

In certain embodiments meta data information can be added in process 550 to the geo-blocks by making use of the meta data computed in process 540. In one embodiment, a geo block can be tagged by their main functionalities as residential, retail, office, commercial block, and industry, etc. In some other embodiment, a geo-block can be alternatively or additionally tagged by its major POIs, such as school, hospital, airport, stadium, etc. FIG. 11 illustrates exemplary data structures of meta data enriched geo-blocks according to certain embodiments. The added meta data can be used in location-based information services, such as ad targeting, ad performance optimization, location-based social networking, etc.

Thus, the present disclosure provides a system and method that produces geo-blocks by partitioning urban areas using geographical information of transportation routes, natural boundaries and other real world objects that are highly relevant to specific types of human activities. Each geo-block has at least one border defined by a real-world object such as a transportation route, a lake, a river, a hill or mountain range, a recreational area, a boundary of a large developed area, such as a school, an airport, etc., and can possess meta data indicating certain attributes such as neighborhood, office, school, airport etc. Actually, most of the geo-blocks are each bordered on all sides or multiple sides by such real world objects. The geo-blocks thus generate features with high level of relevance to real world location partitions, naturally avoid passing by road traffic, and offer flexible level of granularity for location-based information services and location targeting purposes.

Figure 12:
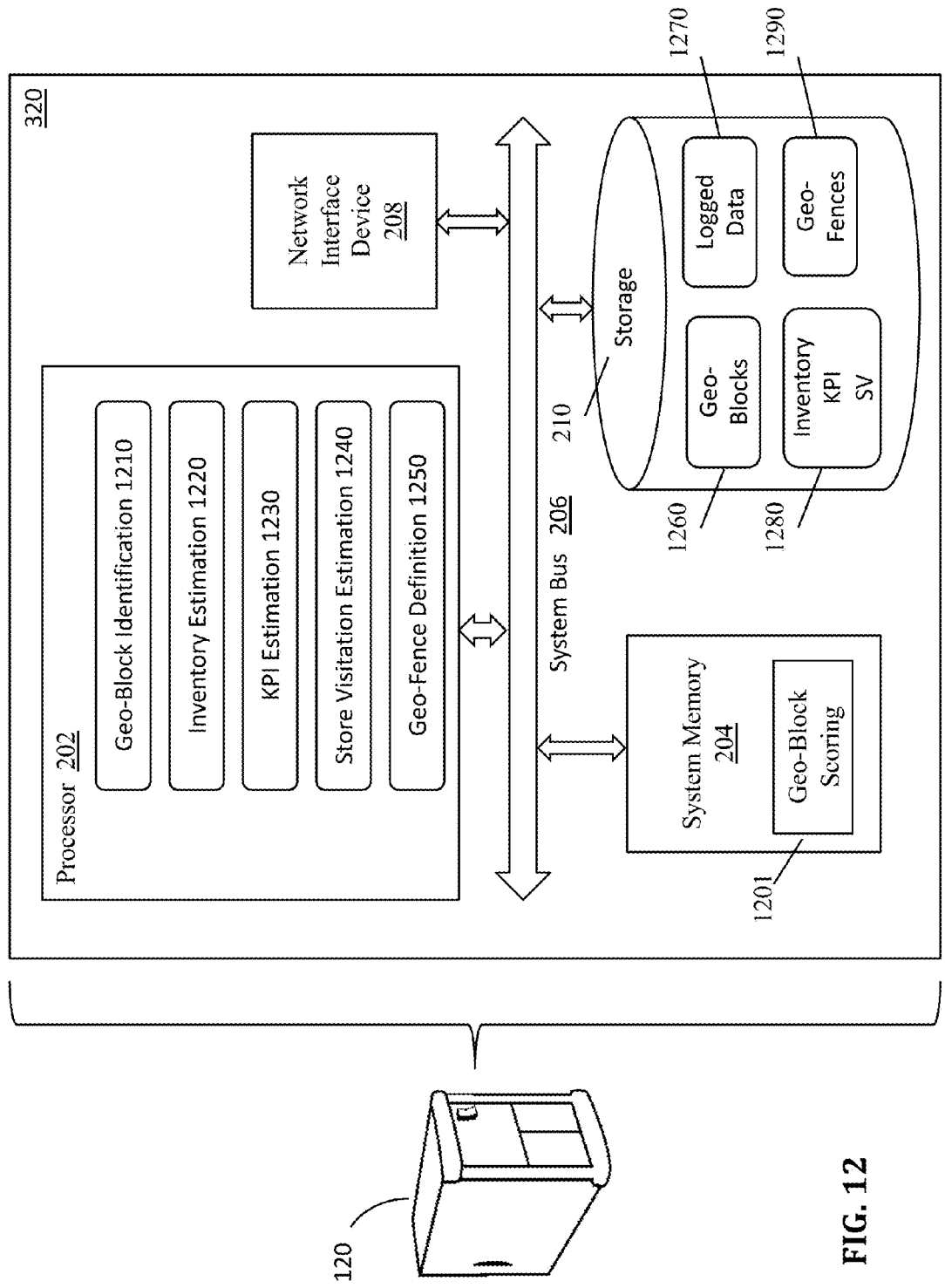
FIG. 12 is a diagrammatic representation of a geo-block scoring subsystem that scores and ranks the geo-blocks produced by the geo-block definition subsystem according to certain embodiments.

For example, FIG. 12 is a diagrammatic representation of a geo-block scoring subsystem 320 that scores and ranks the geo-blocks produced by the geo-block definition subsystem 310 according to certain embodiments. In certain embodiments, the system 320 is provided by a computer/server system 120, which can be the same computer/server system 120 that also provides the subsystem 310 or a different computer/server system. As shown in FIG. 12, the processor 202 in a computer/server system 120, when executing a geo-block scoring software program 1201 loaded in the main memory 204, provides the geo-block scoring subsystem 320, including a geo-block identification module 1210, an inventory estimation module 1220, a key performance index (KPI) estimation module 1230, and a store visitation estimation module 1240. Subsystem 320 may further include a geo-fence definition module 1250. Subsystem 320 makes use of a plurality of databases storing data used and/or generated by the subsystem 320, including a database 1260 for storing the geo-blocks generated by the subsystem 310, a database 1270 for storing logged mobile supply data, one or more databases (e.g., database 1280) for storing block level estimation results, including block-level inventory estimation results, KPI estimation results, and store visitation estimation results, and database 1290 for storing geo-fences. Any or all of these databases can be located in the storage 210, or in another server/computer 120 and/or NAS 121 in the network 100, which the process 202 can access via the network interface device 208.

Figure 13A:
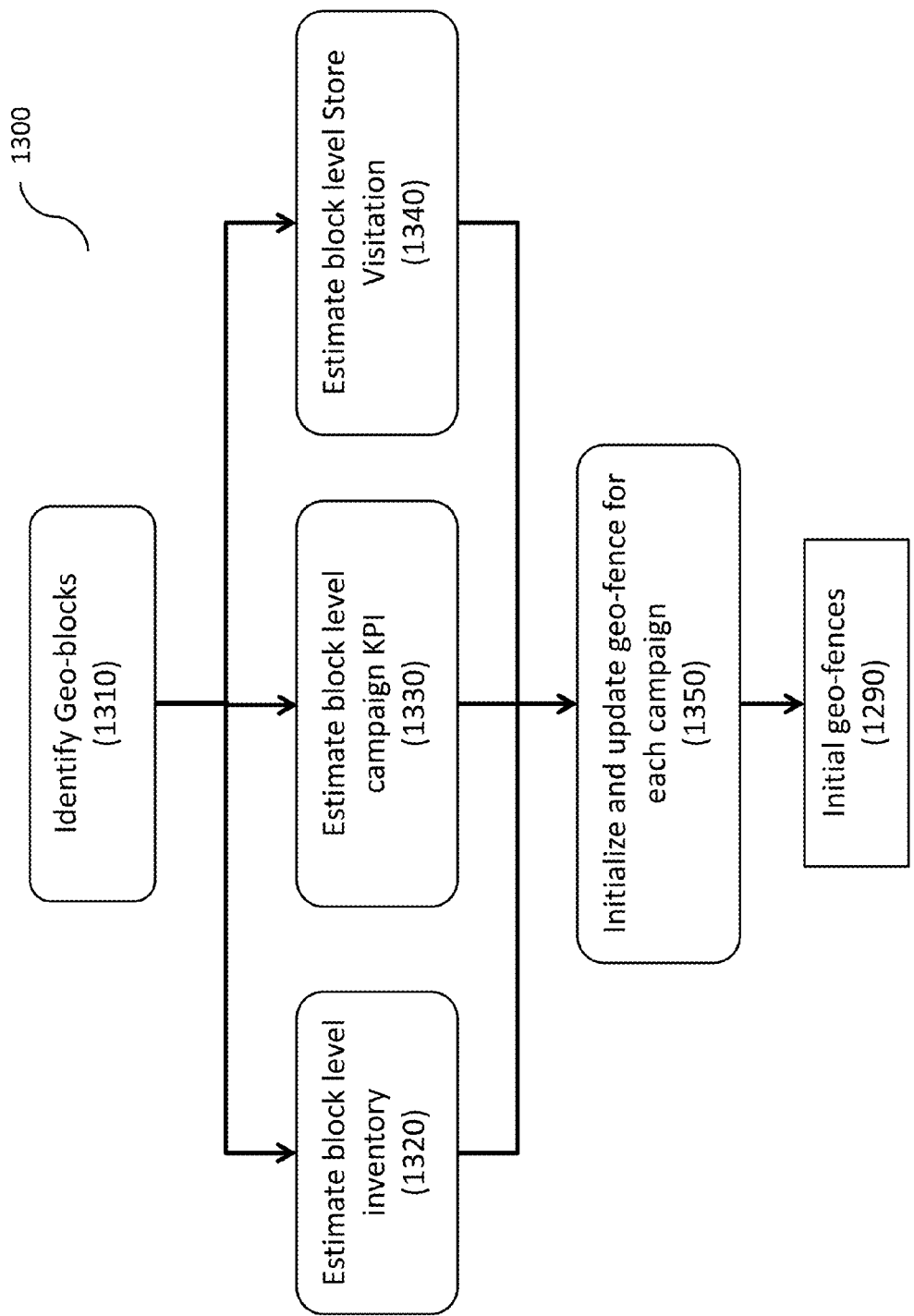
FIG. 13A is a flowchart illustrating a geo-block scoring method performed by the geo-block scoring subsystem according to certain embodiments.
Figure 15:
FIG. 15 is a map overlay diagram illustrating of an exemplary geo-fence including higher-scoring geo-blocks selected from geo-blocks in a targeted geographical area around a point of interest (POI) according to certain embodiments.

FIG. 13A is a flowchart illustrating a geo-block scoring method 1300 performed by the geo-block scoring subsystem 320 according to certain embodiments. As shown in FIG. 13A, the geo-block scoring method 1300 includes identifying 1310 geo-blocks in a targeted region associated with a point of interest (POI), such as a store associated with a brand or a business entity. As shown in FIG. 15, the targeted region can be a circle 1500 drawn around the POI 1501, or an area of arbitrary shape or scale set up by an advertisement campaign for the brand or business. In certain embodiments, the geo-block identification module 1210 identifies the geo-blocks by searching in the geo-block database 1260 for geo-blocks that substantially overlap with the targeted region 1500 associated with the POI 1501 (e.g., at least 50% of the area of each identified geo-block is inside the targeted region associated with the POI).

The method 1300 further includes estimating block-level inventory (1320), in which the inventory estimation module 1220 estimates inventory in each identified geo-block by aggregating request logs along different time frames and along different meta data dimensions. For example, to estimate daily inventory for male users in the 30-40 age group for block_id 1234568, a straight forward method can be to take a daily average of the total number of requests and the total number of unique UIDs seen in the request log that qualifies the meta data requirements and the block_id requirement in the past one week (or month, etc). In some other embodiment, a linear regression model or time series model is used to predict future inventory based on historical log aggregation data applied on different time frames.

The method 1300 further includes estimating block-level campaign KPI (1330), in which KPI estimation module 1230 makes use of the impression (imp) log, click log and SAR log to estimate key performance indices such as click-through rate (CTR), secondary action rate (SAR), etc. for each identified geo-block. The estimation is represented as (BLOCK_ID, CMP_ID, CTR, TF), and (BLOCK_ID, CMP_ID, SAR, TF), where CMP_ID is the campaign id and TF is the timeframe used to calculate the KPI. In some implementation, because the size of a geo-block is relatively small, and a typical campaign runs only for one or two months, it is difficult to collect enough impression and click data at the block level to reliably calculate KPI. For example, it may sometimes require at least 2000 to 5000 impressions to reliably estimate CTR given that the average CTR stands at about 0.5%, and at least 100 or 200 clicks in order to reliably estimate SAR, with average SAR stands at 5%-7%.

To address this issue, in some embodiment, the KPI estimation is rolled up from campaign to vertical level, and the estimation of CTR and SAR are therefore represented as tuples of (BLOCK_ID, VERTICAL_ID, CTR, TF), and (BLOCK_ID, VERTICAL_ID, SAR, TF). Since vertical is not limited by the life cycle of individual campaigns, the time frame of aggregation could also be extended to up to 6 months to get better numbers for KPI estimation.

In some implementation, the rollup in the time frame dimension is also needed to support better KPI estimation. For a particular block, the KPI can be first estimated using data in the past 3 months. If insufficient amount of data is collected, data in the past 6 months is used. In some embodiments, the time frame could be rolled up to 1 year or beyond. In some embodiments, the rollup in the time frame dimension could be weighted such that more recent data points get higher weight than older data points. If rolling up in the time frame dimension cannot produce enough data to calculate KPI for some geo-blocks, averaging across the global campaign level or the global vertical level can be used to estimate KPI for these geo-blocks.

The method 1300 further includes estimating block-level store visitation (SV) (1340) score, in which the store visitation estimation module 1240 calculates a brand visitation likelihood score (SV score) for each identified geo-block. In cases that brand sales revenue is of interest, this likelihood score can be derived from brand customer visitation behavior and purchase behavior. In one embodiment, this likelihood score is measured by store visitation rate (SVR), which is defined as the percentage of unique UIDs seen in a geo-block (BLOCK_ID) that have visited a brand (BRAND_ID) during a given timeframe (TF). This is calculated by using the SV log in the user behavior model database 370 and Request log in the location history database 365 as follows:

(a) find all the UIDs from the Request log whose location is covered by the given block (BLOCK_ID) at least once during the timeframe (TF), count the total unique number of UIDs, which defines the block unique variable;

(b) find the UIDs from the (a) set who have made at least one (or n, where n>0) store visitation (SV) to the interested brand (BRAND_ID) from the SV log during the timeframe TF, and count the total unique number of UIDs, which defines the block_sv variable;

(c) compute the SVR using the two unique UIDs variables:

$$block\_svr = block\_sv / block\_unique$$

Alternatively, block_sv instead of block_svr is used directly as the SV score on the assumption that the average block size is similar and a higher block_sv directly indicates higher SV likelihood.

In certain embodiments, the SV score is computed as in step (b), but considering only users who visited a brand with some repeated pattern. For example, SV score could be defined as the number of users who visited a brand at least once per week in the given time frame TF.

The method 1300 further includes initializing and/or updating the geo-fence for each campaign (1350), in which the geo-fence definition module 1250 determines an optimized initial geo-fence for a particular campaign based on the inventory estimation, KPI estimation and store visitation estimation feeds from modules 1220, 1230, and 1240.

Figure 13B:
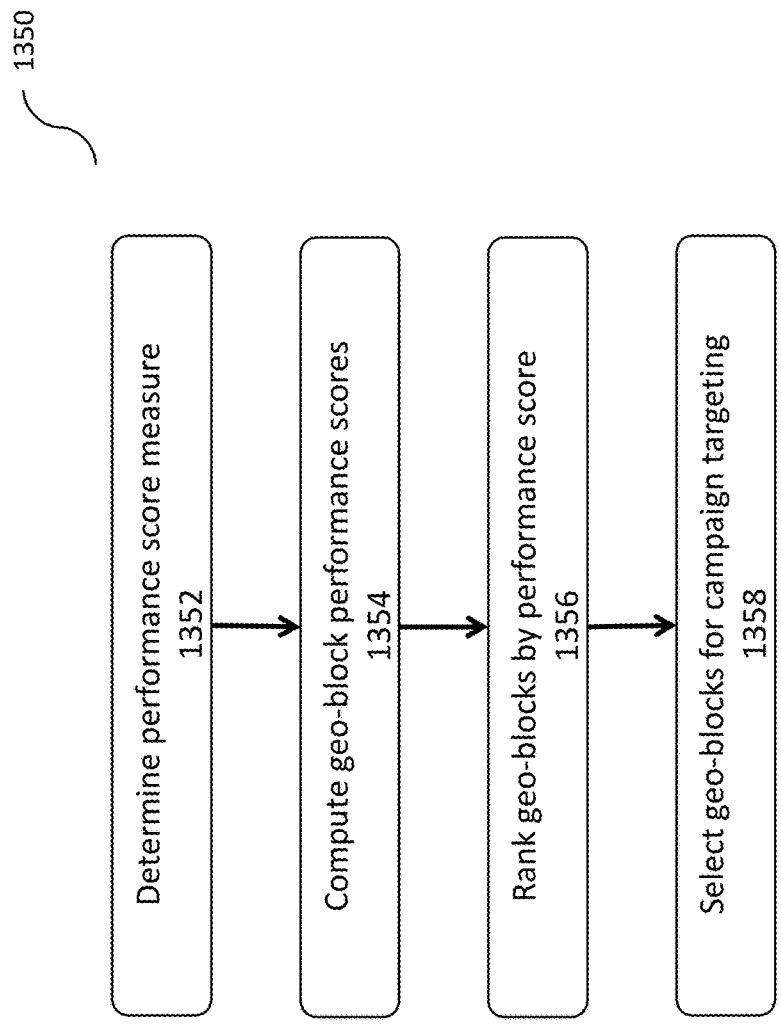
FIG. 13B is a flowchart illustrating an initializing and/or updating process performed by the geo-fence definition module according to certain embodiments

FIG. 13B is a flowchart illustrating an initializing and/or updating process 1350 performed by the geo-fence definition module 1250 according to certain embodiments. As shown in FIG. 13B, the process 1350 includes determining a performance score measure based on the goal of a campaign (1352). For example, if the goal of a campaign is to maximize user clicking engagement, CTR is used as the performance score. Or, if the focus of the campaign is post-click secondary action, then the product of CTR and SAR, which is typically referred to as yield $$YIELD=CTR*SAR,$$

could be used as the score. Or, if the campaign goal is to reach brand loyalists, SVR (block_svr) and/or SV (block_sv) could be used. In a more general case, the score measure could be represented as a weighted sum of these different parameters:

$$Score=w1*CTR+w2*YIELD+w3*SVR+w4*SV$$

where w1, w2, w3, w4 are tune-able weight factors based on the specific campaign goal. CTR and SAR*CTR are two possible KPI goals for a campaign; and SVR and SV are two possible SV score estimations as described.

In certain embodiments, the block quality score is defined using normalized variables as $$Score=w1*N(CTR)+w2*N(YIELD)+w3*N(SVR)+w4*N(SV)$$

where the normalization function NO can be a Gaussian normalization function, such as $$N(x)=(x-m)/STD$$

with m being the average of x and STD being the standard deviation of the x variable for the targetable geo-blocks (i.e., geo-blocks in the targeted region for the given campaign). In certain embodiments, process 1350 further includes computing geo-block performance score for each identified geo-block in the targeted region for the campaign based on the campaign performance score measure (1354). Note that the targeted region is a variable set by the campaign. The region could be a circular radius around the brand's business location, a number of zip codes, a city, a state or even a nation.

In certain embodiment, the performance score for a geographical region (or geo-block) is dependent on the specific campaign performance goal(s). For example, in some cases, an ad campaign's goal is to drive more people to visit their branded stores. Then the performance score of a geographical region can be defined as the likelihood of a user to visit a branded store after the user has visited this geographical region. In certain embodiment the following procedure can be used to estimate the likelihood and derive a performance score for each geographical region:

(a) estimate the probability or rate, Pa, for brand customers to visit a geographical region, as discussed above and in co-pending U.S. patent application Ser. No. 15/289,104, filed Oct. 7, 2016, entitled "Method and Apparatus for Measuring Effect of Information Delivered to Mobile Devices," which is incorporated herein by reference in its entirety;

(b) estimate the probability, Pb, for the general public in a local area (e.g., within 20 miles of a POI) to visit a geographical region; and (c) use the ratio Pa/Pb for each geographical region as an estimation of the likehood for a person visiting a geographical region to also visit the brand of interest. This estimation can be used by itself or combined with other factors such as KPI scores, for example, using, for example, weighted averages, to obtain the performance score for a geo-block.

Figure 14B:
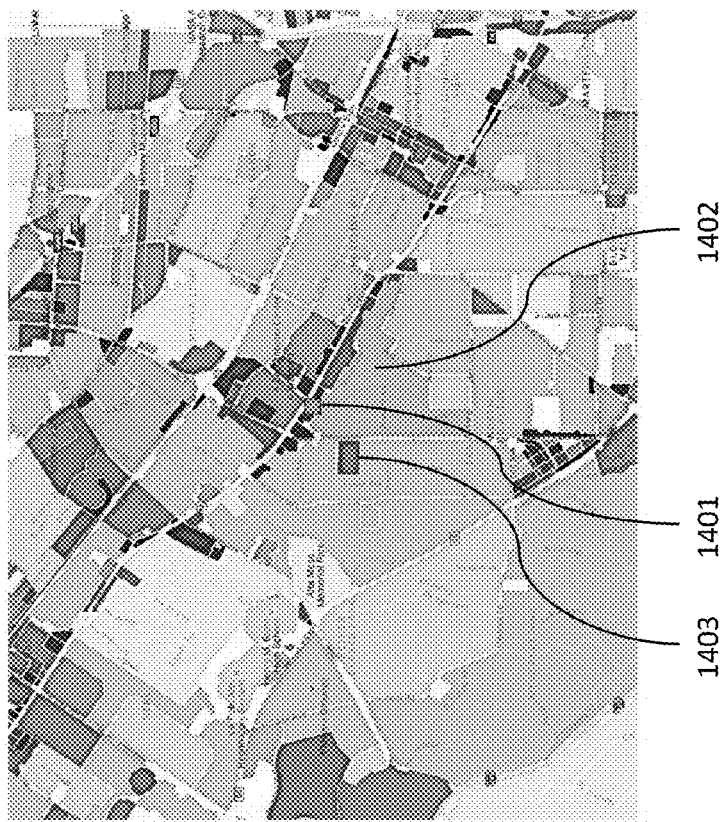
FIGS. 14A and 14B are map overlay diagrams illustrating exemplary geo-blocks with their associated scores derived based on different campaign parameters or performance goals according to certain embodiment.
Figure 14A:
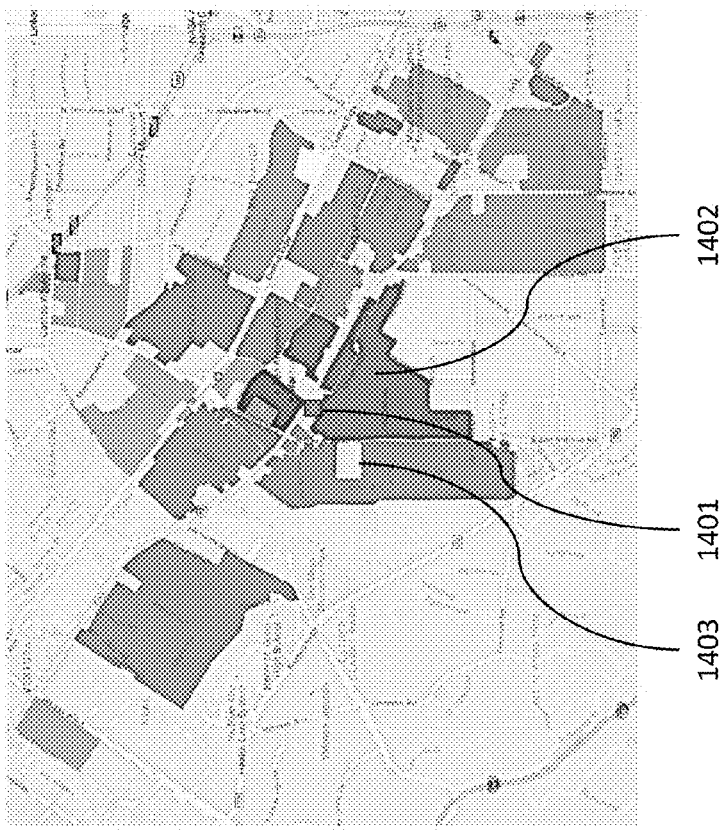

Thus, the geo-blocks can be scored differently for information campaigns with different interests or parameters. For example, FIG. 14A illustrate scores of geo-blocks around a POI 1401 represented by the green square near the center of the plot for an information campaign, where the darker colored geo-blocks represent geo-block with higher performance scores. FIG. 14B illustrate scores of the same geo-blocks around the POI 1401 for a different information campaign, where the darker colored geo-blocks represent geo-block with higher performance scores. As shown in these figures, the relative scores of the same geo-blocks around a same POI can be very different for different campaign parameters or goals. For example, geo-block(s) 1402 has a relatively higher score than geo-block 1403 in FIG. 14A but a relatively lower score than geo-block 1403 in FIG. 14B.

In certain embodiments, process 1350 further includes ranking the identified geo-blocks in the targeted region based on their performance scores (1356), and selecting the geo-blocks with the best performance scores to form the geo-fence for the campaign (1358). In certain embodiments, geo-blocks with performance scores above a certain threshold are selected. In certain embodiments, block level inventory estimation can be used to guide the selection process to make sure that enough blocks are included in the geo-fence such that the total inventory is sufficient for the campaign budget purpose. For example, if a Walmart campaign has a daily budget of $5000, then the selected geo-blocks should have a total daily inventory of at least $5000. In many cases, the daily inventory provision should be well above the budget in order to guarantee smooth delivery.

FIG. 15 illustrates an example of geo-blocks selected to form a dynamic fence for a hyperlocal campaign for a Walmart store in Mountain View, Calif. (POI). The circle 1500 is the targeted area of the campaign, the geo-block 1502 shown in pink near the center of the circle is the block containing the POI 1501 (i.e., the Walmart store), and the geo-blocks in dark gray (i.e., geo-blocks 1503, 1504, 1506, and 1507) are the top performing geo-blocks selected for campaign delivery. The gray geo-blocks 1503, 1504, 1506, and 1507 are selected from among geo-blocks that substantially overlap (e.g., by more than half of their respective area) with the targeted region 1500, and together define a dynamic geo-fence for the POI. Note that geo-block 1503 is selected over other geo-blocks (e.g., geoblocks 1507, 1508, and 1509) that are actually closer to the POI 1501 than the geo-block 1503 and is thus separated from the POI and one or more other selected geo-blocks by one or more non-selected geo-block. In fact, in this example, except geo-block 1505, the selected geo-blocks 1506 are not adjacent to the geo-block 1502 containing the POI and do not even include the geo-block 1502 containing the POI. Thus, the geo-fences formed using the methods in the present disclosure are more attune to optimizing the performance of specific campaigns by selecting targeted regions based on likelihood of success, rather than just proximity to the POI.

In some further implementation, the KPI scores and the SVR and SV scores may be estimated at different times of the day, which means the quality score of each block also evolves by time. This leads to a time-varying dynamic fence design, which may define different fences for the morning hours and for the evening hours.

Figure 16:
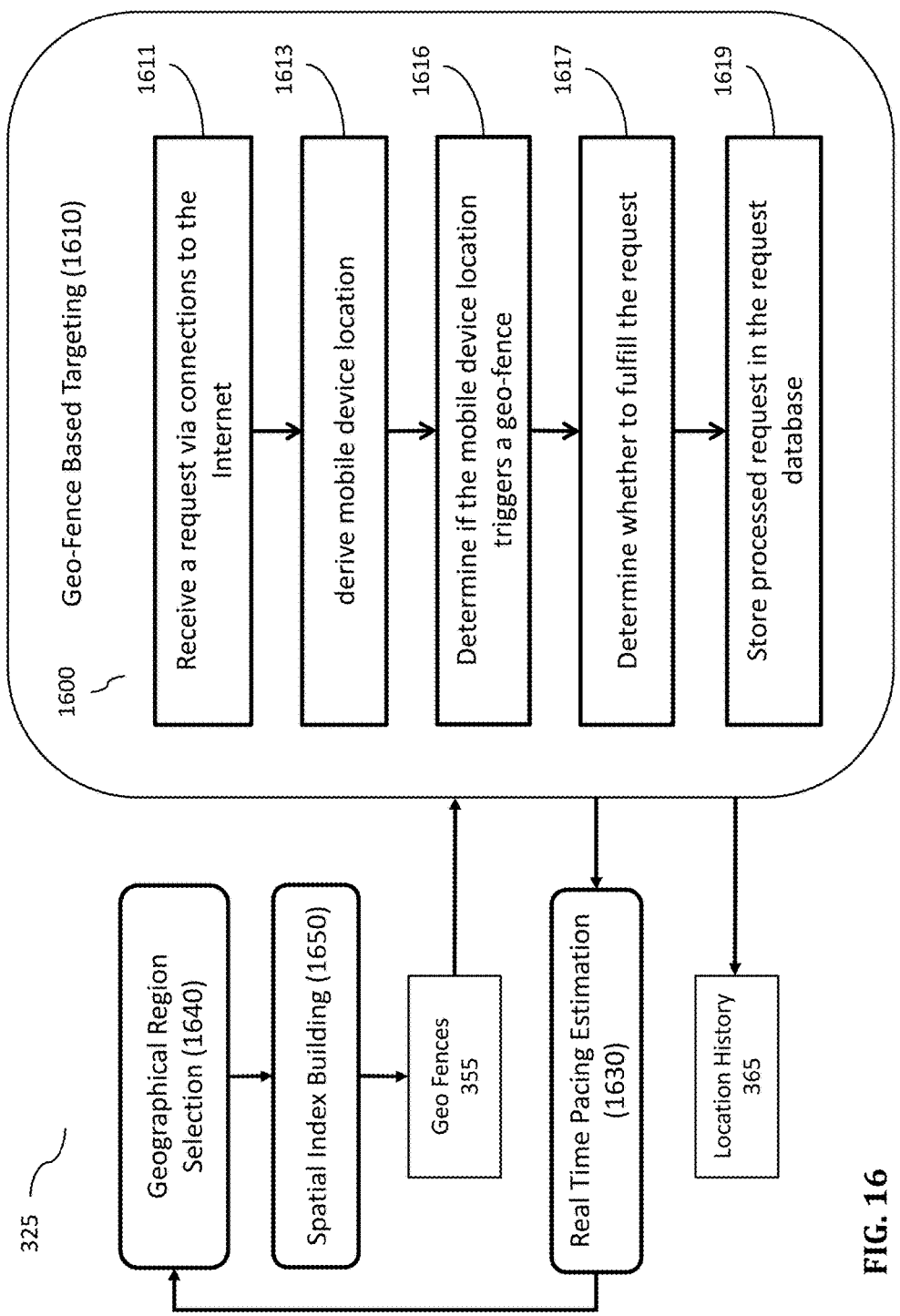
FIG. 16 is a block diagram of a geo-fence construction subsystem according to certain embodiments.

Referring to FIG. 16, according to certain embodiments, the geo-fence construction subsystem 325 includes a geofence based targeting module 1610, a real-time pacing estimation module 1630, a geographical region selection module 1640 and a spatial index building module 1650, which are provided by one or more computer/server systems 120 executing one or more software programs. The geofence based targeting module 1610 receives and processes information requests presented by an information server, e.g., mobile publishers, ad middleman, and/or ad exchanges, etc. via the network 110. Each information request is related to a mobile device and arrives at the geo-fence based targeting module 1610 in the form of, for example, a data packet including data unites carrying respective information, such as identification of the mobile device (or its user) (UID), maker/model of the mobile device (e.g., iPhone 6S), an operating system running on the mobile device (e.g., iOS 10.0.1), attributes of a user of the mobile device (e.g., age, gender, education, income level, etc.), location of the mobile device (e.g., city, state, zip code, IP address, latitude/longitude or LL, etc.). The request data packet may also include a request time stamp, a request ID, and other data/information.

The geo-fence based targeting module 1610 in certain embodiments performs a method 1600 for processing the request data packet, as illustrated in FIG. 16. The method 1600 comprises receiving an information request via connections to a network such as the Internet (1611), deriving a mobile device location based on the location data in the information request (1613), determining if the mobile device location triggers one or more predefined places or geo-fences (1615), taking steps to fulfill the request if the mobile device location triggers one or more predefined places or geo-fences (1617), and storing information in the processed request in the location history database 365 for analysis (1619).

In certain embodiments, deriving the mobile device location (1613) comprises processing the location information in the requests using the smart location system and method described in co-pending U.S. patent application Ser. No. 14/716,816, filed May 19, 2015, entitled "System and Method for Estimating Mobile Device Locations," which is incorporated herein by reference in its entirety. The derived mobile device location is used to search in the spatial index database 355 for a geo-fence in which the mobile device related to the request may be located. If the ad request is found to have triggered a geo-fence in the spatial index database 355, the request is annotated with tags corresponding to the geo-fence. The tags may identify business/brand names, categories of the products or services associated with the business/brand names, and the geo-fence, etc., resulting in an annotated request. The processed requests are stored in a request log in the database 365.

In certain embodiments, fulfilling the request may include comparing the annotated request with matching criteria of a number of information campaigns stored in the campaign database 360, taking into consideration other factors such as budget, pacing, etc. In certain embodiment, fulfilling the request may include providing the annotated request to an information server system, which uses real-time bidding (RTB). In typical ad serving systems based on Real Time Bidding (RTB), a qualifying request does not always get fulfilled and thus results in an impression event. For example, an ad campaign may run out of a pacing budget, or the same request qualifies for more than one campaigns, or the geo-fence based targeting module 1610 does not win the bidding, etc.

Pacing is a control logic that determines how an advertiser's budget should be spent relative to time so as to optimize return on investment (ROI) for the advertisers. Without pacing, the information server system would try to fulfill as many matching requests as possible, exhausting the campaign budget in the early stage of the campaign. With pacing, one or more periodic (e.g., hourly, daily, or weekly) delivery goals (budgets) are set, and an information server system 120 uses a step-by-step methodology to create a plan to pace the fulfillment of matching requests for an information campaign so as to meet its daily and/or hourly delivery goals. Thus, an ad request matching a campaign is only fulfilled when a certain periodic goal has not been reached or a related budget has not been exhausted.

Thus, upon determining that the data units and tags in the annotated requests matches one or more information campaigns, the geo-fence based targeting module 1610 or another information server system decides whether to fulfil the request and which matching ad campaign to select to fulfill the request based on factors such as pacing, historical data about the behavior of the related mobile device (user) stored in the historical data database 365 etc. The one or more other information server systems 120 fulfills the request by attaching a link to a document associated with the selected information campaign to the annotated request, and transmits the annotated request to the information server interacting with the mobile device, e.g., mobile publishers, ad middleman, and/or ad exchanges, etc. via the network 110. The geo-fence based targeting module 1610 also monitors feedbacks indicating whether the document associated with the one or more information campaigns has been delivered to (or impressed upon) the related mobile device and provides the feedback to the real-time pacing estimation module 1630. The feedback may also be stored in the impression log in the database 470.

At the start of an information campaign, the geo-fence or spatial index database 355 stores the initial geo-fences provided by the geographical region scoring subsystem 320. As the campaign proceeds in real-time, the real-time pacing estimation module 1630 periodically estimates a pacing status of the campaign based on the feedback provided by the geo-fence based targeting module 1610. The geographical region selection module 1640 compares the pacing status provided by the real-time pacing estimation module 1630 with a predetermined pacing goal for the campaign, and increases/decreases the number of geographical regions included in an active geo-fence accordingly. The spatial index building module then calculates the spatial index for the updated geo-fence and updates the geo-fence database 355 accordingly. The real-time pacing estimation module 1630 controls the dynamics of the geo-fences through, for example, the rate at which the geo-fence is updated and the minimum/maximum number of geographical regions that can be included in the geo-fence. Thus, the real-time pacing estimation module 1630 controls the balance between performance and pacing, as well as their minimum/maximum attainable values.

Thus, the geo-fence construction subsystem 325 receives and processes information requests related to mobile users and determines whether the mobile users are potential candidates for receiving certain information services. Concurrently, the geo-fence construction subsystem 325 also tracks the rate at which information related to a certain information campaign is being served to mobile users (i.e., pacing status) and adjusts the number of geo-blocks included in a geo-fence associated with the information campaign accordingly, so as to reach a balance between performance and pacing.

Figure 17C:
FIGS. 17A-17C are map overlay diagrams of geo-blocks around a point of interest illustrating dynamic inclusion into or exclusion from a geo-fence certain geo-blocks based on a pacing status of an information campaign according to certain embodiments.
Figure 17B:
Figure 17A:
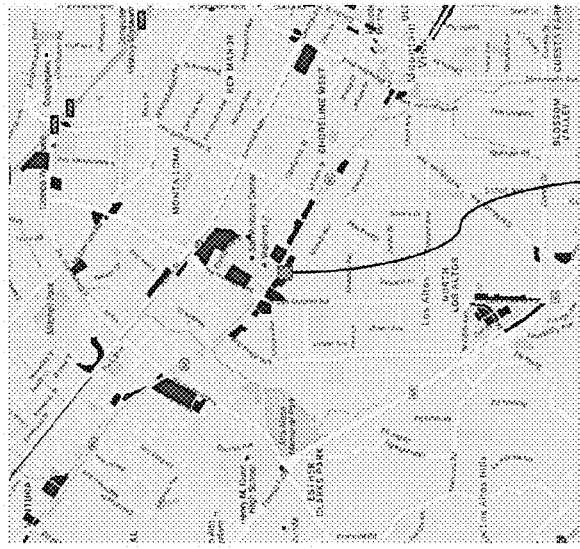

FIGS. 17A-17C illustrates this dynamic geo-fencing process according to certain embodiments. FIGS. 17A-17C are plots of geo-blocks around a point of interest 1701 represented by the green square near the center of the plots. The blue shaded geo-blocks are those included in a geo-fence associated with an information campaign at a particular time instance. Mobile device users located within these blue shaded areas at that time instance are potential candidates for receiving information service. At an earlier time instance within a first time period, as shown in FIG. 17A, only geo-blocks with performance scores above a first threshold are included in the geo-fence. From FIG. 17A to FIG. 17C, in response to the pacing status indicating that the pacing goal is not being reached, gradually more geo-blocks are included as part of the geo-fence to meet the pacing goal for the information campaign. For example, geo-block 1702 originally not included in the geo-fence as shown in FIG. 17A is now added to the geo-fence. In FIG. 17B, geo-blocks with performance scores above a second threshold lower than the first threshold are included in the geo-fence, and then later in FIG. 17C, when it is determined that more requests are needed to meet the pacing goal, geo-blocks with performance scores above a third threshold lower than the second threshold are included in the geo-fence. For example, geo-block 1703 originally not included in the geo-fence as shown in FIG. 17A or FIG. 17B is now included. Thus, by increasing the number of geo-blocks for an information campaign that is lagging behind its pacing goal(s) or by decreasing the number of geo-blocks for an information campaign that is ahead of its pacing goal(s), the performance of the geo-fence can be optimized to reach a balance between performance and pacing.

We claim:

1. A method performed by one or more computer systems to process information requests from a packet-based network, each of the one or more computer systems including at least one processor, comprising:

receiving, by a processor of the one or more computer systems, a first plurality of requests from one or more servers in the packet-based network, the first plurality of requests being associated with a first plurality of mobile devices communicating with the packet-based network, each request of the first plurality of requests including request data derived from signals transmitted by one of the first plurality of mobile devices, the request data including location data indicating a location of the one of the first plurality of mobile devices;

generating, by a processor of the one or more computer systems, a request log from the first plurality of requests, the request log including a first plurality of entries corresponding to respective ones of at least some of the first plurality of requests, each entry of the first plurality of entries identifying a geo-block, the identified geo-block being one of a plurality of geo-blocks in a geo-block database stored in a storage space accessible by the one or more computer systems, each of the plurality of geo-blocks corresponding to a geographical region having at least one border defined by a public road or natural boundary;

generating, by a processor of the one or more computer systems, a store visitation (SV) log from the requests, the SV log including a second plurality of entries corresponding to respective ones of at least some of the first plurality of requests, each entry of the second plurality of entries identifying at least one brand having a geo-fence triggered by the location data in a corresponding request;

determining, by a processor of the one or more computer systems, a performance measure for each of the plurality of geo-blocks based at least on data in the request log and the SV log;

selecting, by a processor of the one or more computer systems, one or more first geo-blocks from the plurality of geo-blocks, each of the one or more first geo-blocks having a performance measure above a first threshold;

receiving, by a processor of the one or more computer systems, a second plurality of requests from one or more servers in the packet-based network, the second plurality of requests being associated with a second plurality of mobile devices communicating with the packet-based network, each request of the second plurality of requests including request data derived from signals transmitted by one of the second plurality of mobile devices, the request data including location data indicating a location of the one of the second plurality of mobile devices;

for each respective request of the second plurality of requests, determining, by a processor of the one or more computer systems, whether the location data in the each respective request triggers any of the one or more first geo-blocks, and providing, by a processor of the one or more computer systems, the each respective request for fulfillment in response to the location data in the each respective request triggering one of the one or more first geo-blocks;

monitoring, by a processor of the one or more computer systems, a rate at which requests among the second plurality of requests are being fulfilled;

in response to the rate lagging behind pacing goal, selecting, by a processor of the one or more computer systems, second geo-blocks from the plurality of geo-blocks in the geo-block database, each of the second geo-blocks having a performance measure above a second threshold below the first threshold;

receiving, by a processor of the one or more computer systems, a third plurality of requests from one or more servers in the packet-based network, the third plurality of requests being associated with a third plurality of mobile devices communicating with the packet-based network, each request of the third plurality of requests including request data derived from signals transmitted by one of the third plurality of mobile devices, the request data including location data indicating a location of the one of the third plurality of mobile devices; and for each particular request of the third plurality of requests, determining, by a processor of the one or more computer systems, whether the location data in the each particular request triggers any of the second geo-blocks, and providing, by a processor of the one or more computer systems, the each particular request for fulfillment in response to the location data in the each particular request triggering second geo-blocks.

2. The method of claim 1, wherein each geo-block among the plurality of geo-blocks is associated with meta data specific to the each geo-block, the meta data including one or more of neighborhood attributes associated with the each geo-block, a main functionality associated with the each geo-block, point of interest (POI) data associated with the each geo-block, and demographic data associated with the each geo-block, and wherein the performance measure for the each geo-block is further determined based on the meta data associated with the each geo-block.

3. The method of claim 2, wherein the meta data include human activity levels in the each geo-block derived from data in the request log.

4. The method of claim 2, wherein the meta data include data associated with one or more points of interests located in the each geo-block.

5. The method of claim 2, further comprising updating the request log while processing the second plurality of requests and adjusting the meta data based on data in updated request log.

6. The method of claim 1, wherein at least one geo-block among the one or more first geo-blocks is separated from at least another geo-block among the one or more first geo-blocks by one or more third geo-blocks not among the one or more first geo-blocks.

7. The method of claim 1, wherein each request of the first plurality of request is associated with a user identification (UID), wherein determining a performance measure for a particular geo-block of the plurality of geo-blocks comprises:
   searching the request log for a first number of UIDs, each UID of the first number of UIDs being associated with at least one entry in the request log that identifies the particular geo-block; and
   searching the SV log for a second number of UIDs, each UID of the second number of UIDs being among the first number of UIDs and associated with at least one entry in the SV log that identifies a brand of interest;
   wherein the performance measure for the particular geo-block is determined based at least on the first number and the second number.

8. The method of claim 1, wherein determining a performance measure for a particular geo-block of the plurality of geo-blocks in the geo-block database comprises:
   searching the request log for a number of related requests, each request of the number of related requests being associated with at least one entry in the request log that identifies the particular geo-block and with one entry in the SV log that identifies a brand of interest;
   wherein the performance measure for the particular geo-block is determined based at least on the number of related requests.

9. The method of claim 1, wherein the performance measure for a particular geo-block among the plurality of geo-blocks is determined based at least on one or more estimated key performance indices (KPI) associated with the particular geo-block.

10. The method of claim 9, wherein the one or more computer systems have access to additional storage spaces storing therein one or more of an impression log, a click log and a secondary action rate (SAR) log, and wherein the KPI includes one or more of a click-through rate and a secondary action rate that are derived from the one or more of the impression log, the click log and the SAR log.

11. The method of claim 1, wherein the performance score for each respective geo-block among the plurality of geo-blocks is determined based at least on an estimated likelihood of a mobile user visiting a brand of interest when a request associated with the mobile user includes location data triggering the each respective geo-block.

12. The method of claim 1, further comprising:
   obtaining, by a processor of the one or more computer systems, transportation route and natural boundary data via the packet-based network;
   extracting, by a processor of the one or more computer systems, geo-data from the transportation route and natural boundary data, the geo-data defining a set of transportation routes and natural boundaries in a geographical area;
   generating, by a processor of the one or more computer systems, initial geo-blocks from the geo-data, each of the initial geo-blocks corresponding to a geographical region having at least one border defined by a a public road or natural boundary;
   enriching, by a processor of the one or more computer systems, each respective initial geo-block with block-level meta data to form an enriched geo-block, the block-level meta data including location specific attributes associated with the each respective initial geo-block; and
   storing the enriched geo-blocks in the geo-block database.

13. The method of claim 12, further comprising:
   receiving real-time inputs from the packet-based network, the real-time inputs including location information associated with mobile devices in communication with the packet-based network;
   for each one of the real-time inputs, determining whether the each one of the real-time inputs triggers any of the initial geo-blocks; and
   logging a set of data associated with real-time inputs that have triggered a particular initial geo-block; and
   wherein the block-level meta data for the particular initial geo-block includes one or more attributes derived using the set of data associated with the real-time inputs that have triggered the particular initial geo-block.

14. The method of claim 13, further comprising merging two or more of the initial geo-blocks based on their respective block-level meta data.

15. The method of claim 12, further comprising splitting a geo-block into two or more geo-blocks based its block-level meta data.

16. The method of claim 12, wherein the block-level meta data include data selected from the group consisting of: zip data, POI data, demographic data.

17. The method of claim 1, further comprising:
   in response to the first rate being ahead of the pacing goal, selecting, by a processor of the one or more computer systems, a subset of the one or more first geo-blocks, each of the subset of the one or more first geo-locks having a performance measure above a third threshold higher than the first threshold;
   receiving, by a processor of the one or more computer systems, a fourth plurality of requests from one or more servers in the packet-based network, the fourth plurality of requests being associated with a fourth plurality of mobile devices communicating with the packet-based network, each request of the fourth plurality of requests including request data derived from signals transmitted by one of the fourth plurality of mobile devices, the request data including location data indicating a location of the one of the fourth plurality of mobile devices; and
   for each specific request of the fourth plurality of requests, determining, by a processor of the one or more computer systems, whether the location data in the each specific request triggers any of the subset of the one or more first geo-blocks, and providing, by a processor of the one or more computer systems, the each specific request for fulfillment in response to the location data in the each specific request triggering one of the subset of the one or more first geo-blocks.

18. The method of claim 1, wherein generating the request log comprises processing each of the first plurality of requests with respect to the plurality of geo-blocks to determine whether the location data in the each of the first plurality of requests trigger one of the plurality of geo-blocks.

19. The method of claim 18, wherein generating the SV log comprises determining whether the location data in the each of the first plurality of requests further trigger a geo-fence associated with one of a plurality of points of interest.

20. A system for processing information requests from a packet-based network, comprising:
- a geo-fence database storing therein a plurality of points of interests (POIs) and at least one geo-fence for each of the plurality of POIs;
- a geo-block database storing therein a plurality of geo-blocks, each of the plurality of geo- blocks corresponding to a geographical region having at least one border defined by a public road or natural boundary;
- a request processing subsystem configured to receive a first plurality of information requests from one or more servers in the packet-based network, the first plurality of requests being associated with a first plurality of mobile devices communicating with the packet-based network, each request of the first plurality of requests including request data derived from signals transmitted by one of the first plurality of mobile devices, the request data including location data indicating a location of the one of the first plurality of mobile devices, wherein the request processing subsystem is further configured process each of the first plurality of requests with respect to the POIs in the geo-fence database and with respect to the geo-blocks in the geo-block database, and to generate at least a request log and a store-visitation log, the request log including a first plurality of entries corresponding to respective ones of at least some of the plurality of requests, each entry of the first plurality of entries identifying a geo-block, the identified geo-block being one of the plurality of geo-blocks in the geo-block database, the SV log including a second plurality of entries corresponding to respective ones of at least some of the first plurality of requests, each entry of the second plurality of entries identifying at least one brand associated with one of the plurality of POIs having a geo-fence triggered by the location data in a corresponding request;
- a geo-block scoring subsystem configured to determine a performance measure for each of the plurality of geo-blocks based at least on data in the request log and the SV log;
- a geo-fence definition module configured to select one or more first geo-blocks from the plurality of geo-blocks in the geo-block database, each of the one or more first geo-blocks having a performance measure above a first threshold;
- wherein the request processing subsystem is further configured to receive a second plurality of requests from one or more servers in the packet-based network, the second plurality of requests being associated with a second plurality of mobile devices communicating with the packet-based network, each request of the second plurality of requests including request data derived from signals transmitted by one of the second plurality of mobile devices, the request data including location data indicating a location of the one of the second plurality of mobile devices;
- wherein the request processing subsystem is further configured to determine, for each respective request of the second plurality of requests, whether the location data in the each respective request triggers any of the one or more first geo-blocks;
- wherein the request processing subsystem is further configured to provide the each respective request for fulfillment in response to the location data in the each respective request triggering one of the one or more first geo-blocks;
- wherein the request processing subsystem is further configured to monitor a rate at which requests among the second plurality of requests are being fulfilled;
- wherein the geo-fence definition module is further configured to select, in response to the rate lagging behind a pacing goal, second geo-blocks from the plurality of geo-blocks in the geo- block database, each of the second geo-blocks having a performance measure above a second threshold that is below the first threshold;
- wherein the request processing subsystem is further configured to receive a third plurality of requests from one or more servers in the packet-based network, the third plurality of requests being associated with a third plurality of mobile devices communicating with the packet-based network, each request of the third plurality of requests including request data derived from signals transmitted by one of the third plurality of mobile devices, the request data including location data indicating a location of the one of the third plurality of mobile devices; and
- wherein the request processing subsystem is further configured to determine, for each particular request of the third plurality of requests, whether the location data in the each particular request triggers any of the second geo-blocks, and to provide the each particular request for fulfillment in response to the location data in the each particular request triggering one of the second geo-blocks.

* * * * *

UNITED STATES PATENT AND TRADEMARK OFFICE
CERTIFICATE OF CORRECTION

PATENT NO. : 10,165,403 B2
APPLICATION NO. : 15/344482
DATED : December 25, 2018
INVENTOR(S) : Liang et al.

Page 1 of 1

It is certified that error appears in the above-identified patent and that said Letters Patent is hereby corrected as shown below:

In the Claims

Claim 15, Column 20, Line 29, please delete "based its" and insert --based on its--;

Claim 17, Column 20, Line 38, please delete "geo-locks" and insert --geo-blocks--.

Signed and Sealed this
Ninth Day of April, 2019

Andrei Iancu
*Director of the United States Patent and Trademark Office*